Figure 1:
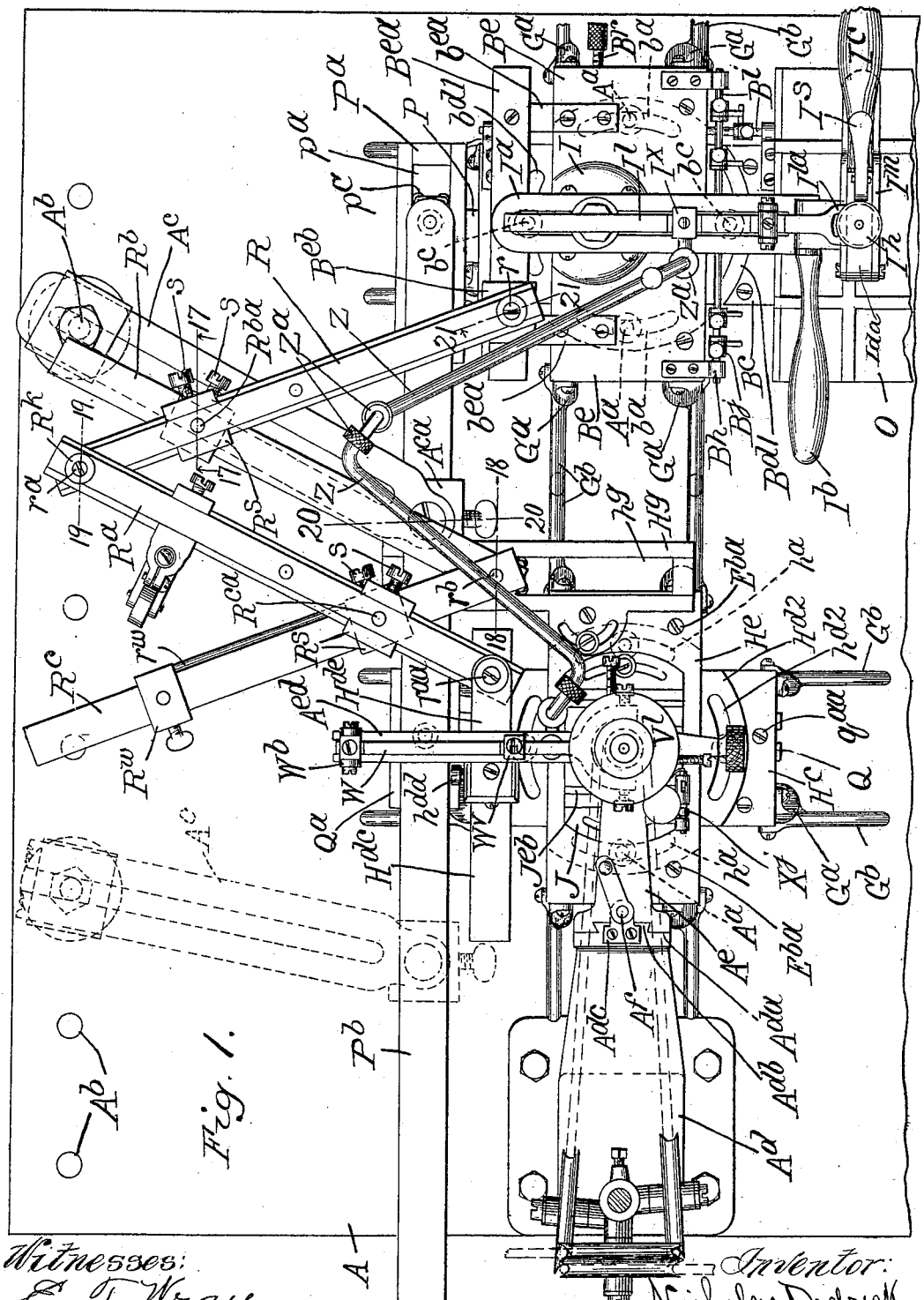

No. 614,845. Patented Nov. 29, 1898.
N. DEDRICK.
ENGRAVING MACHINE.
(Application filed Apr. 16, 1897.)
(No Model.) 10 Sheets—Sheet 1.

Witnesses:
E. T. Wray.
Harry R. L. White.

Inventor:
Nicholas Dedrick
by Burton and Burton
Attorneys.

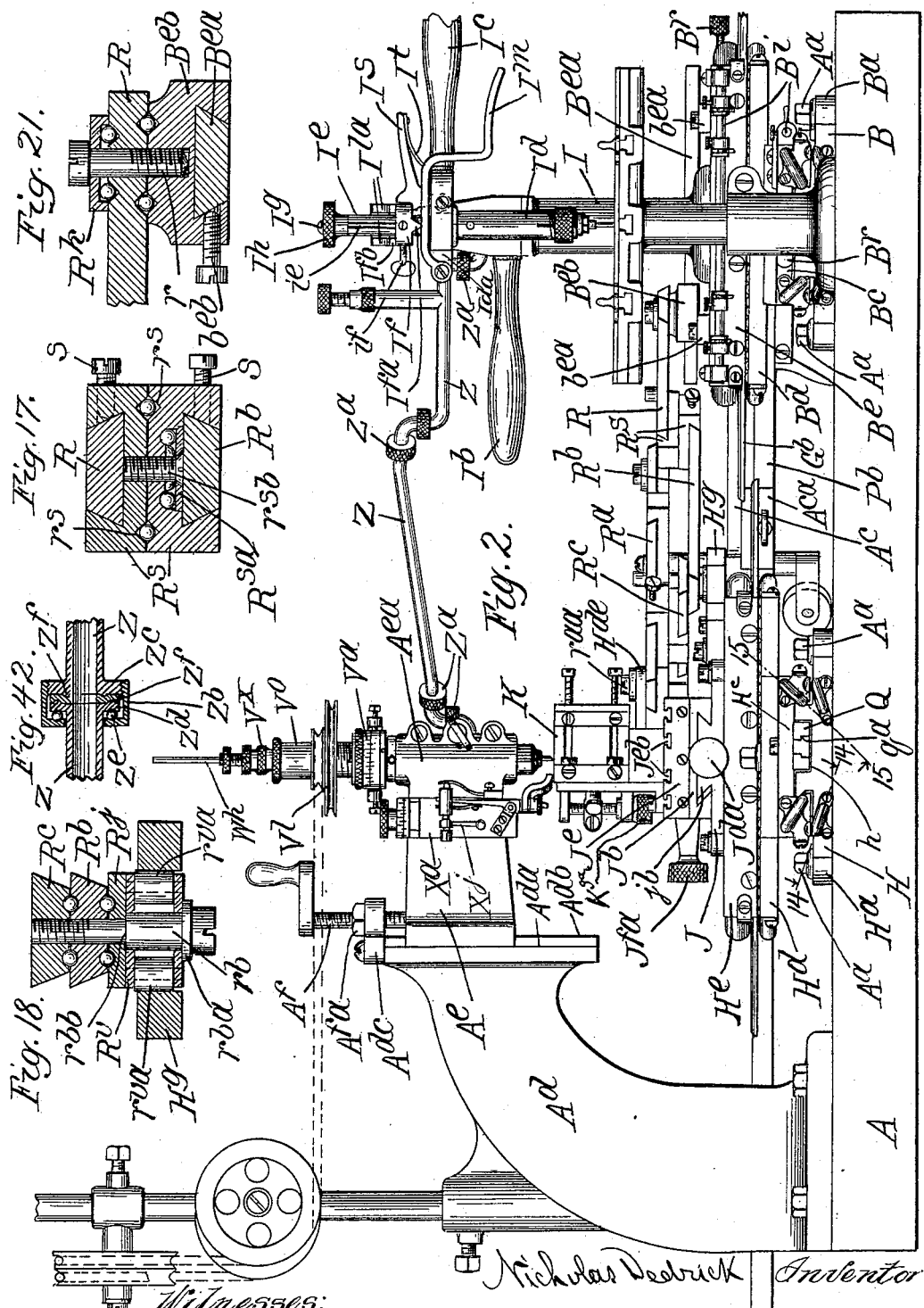

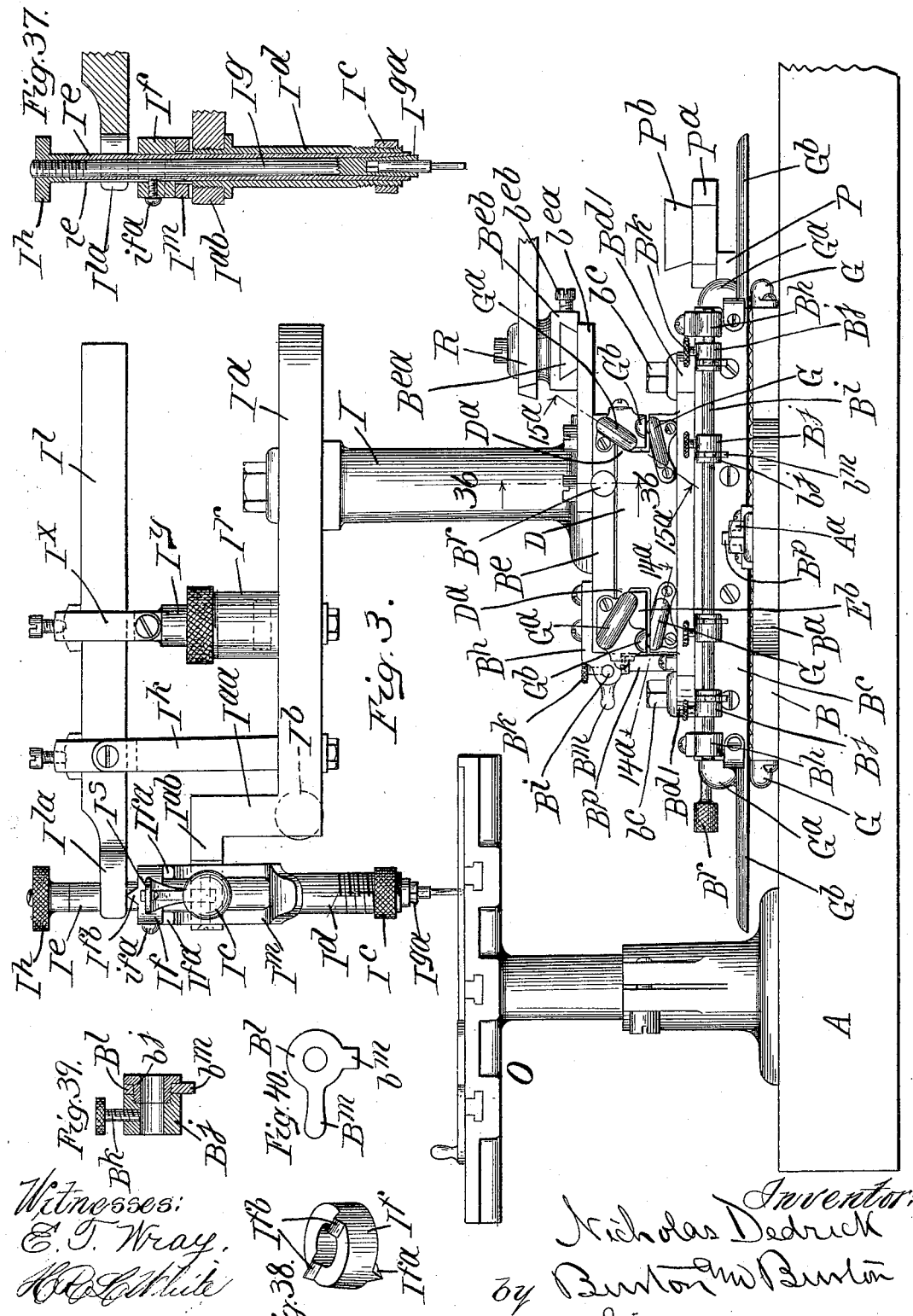

No. 614,845. Patented Nov. 29, 1898.
N. DEDRICK.
ENGRAVING MACHINE.
(Application filed Apr. 16, 1897.)
(No Model.) 10 Sheets—Sheet 4.
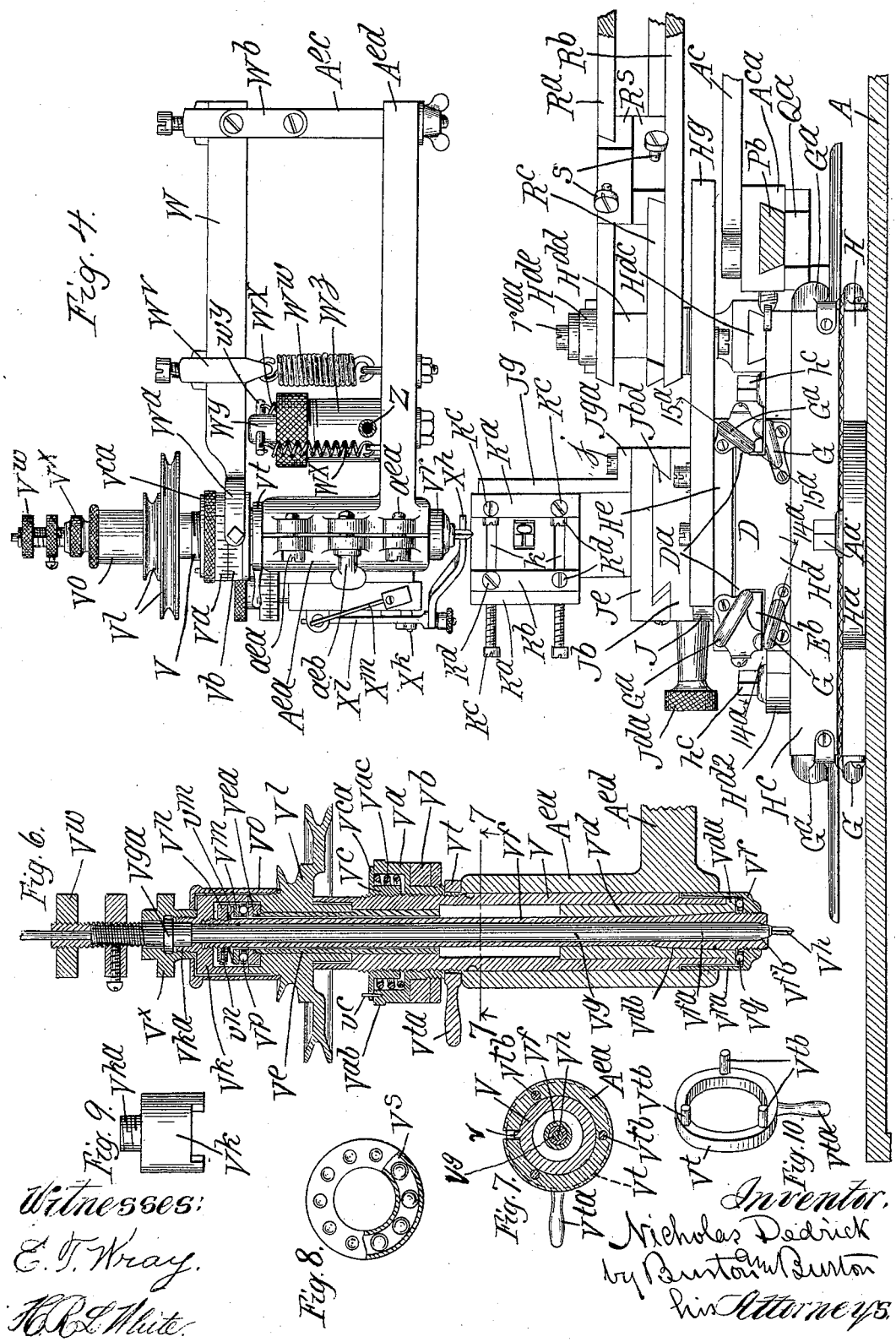

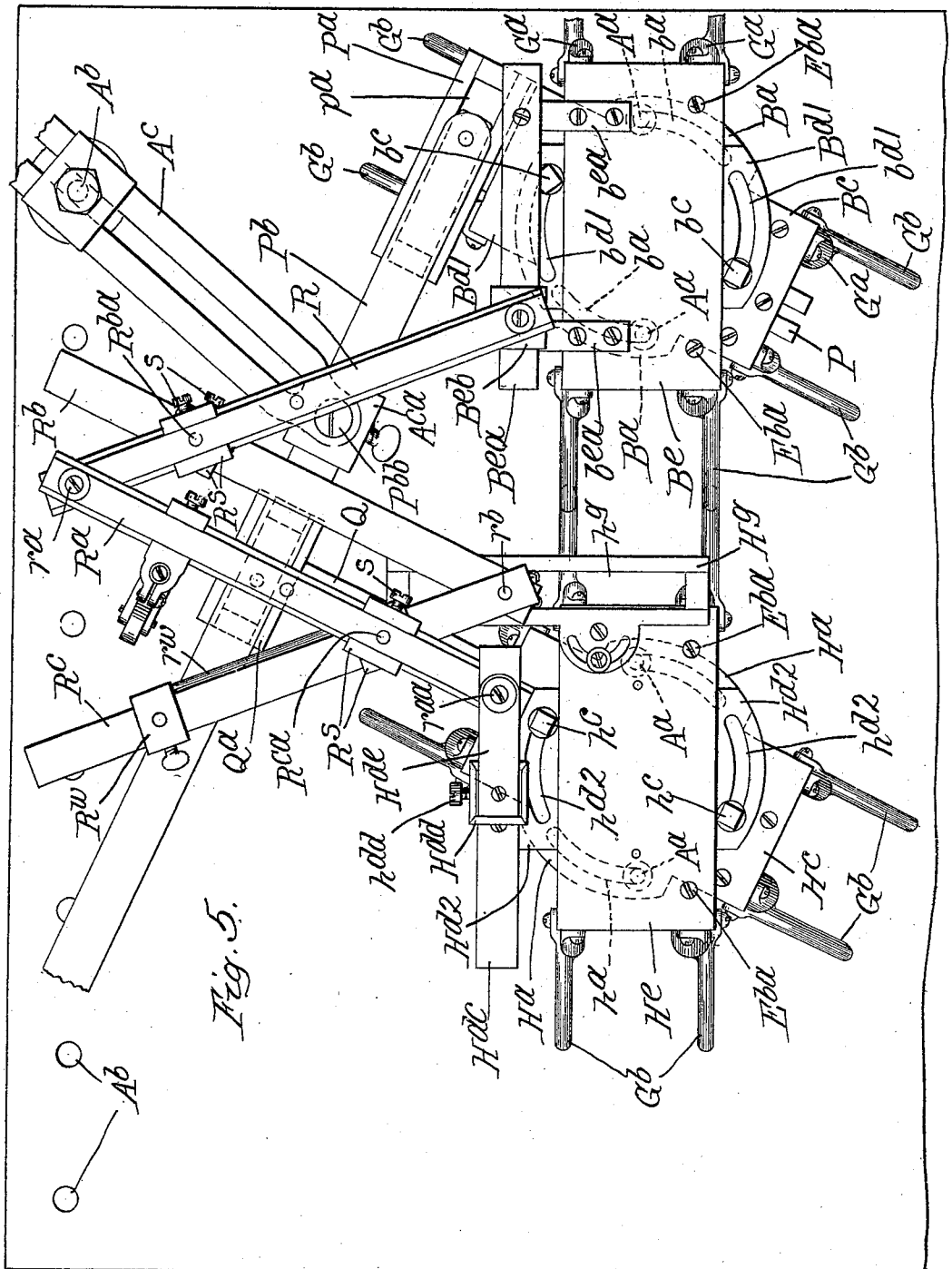

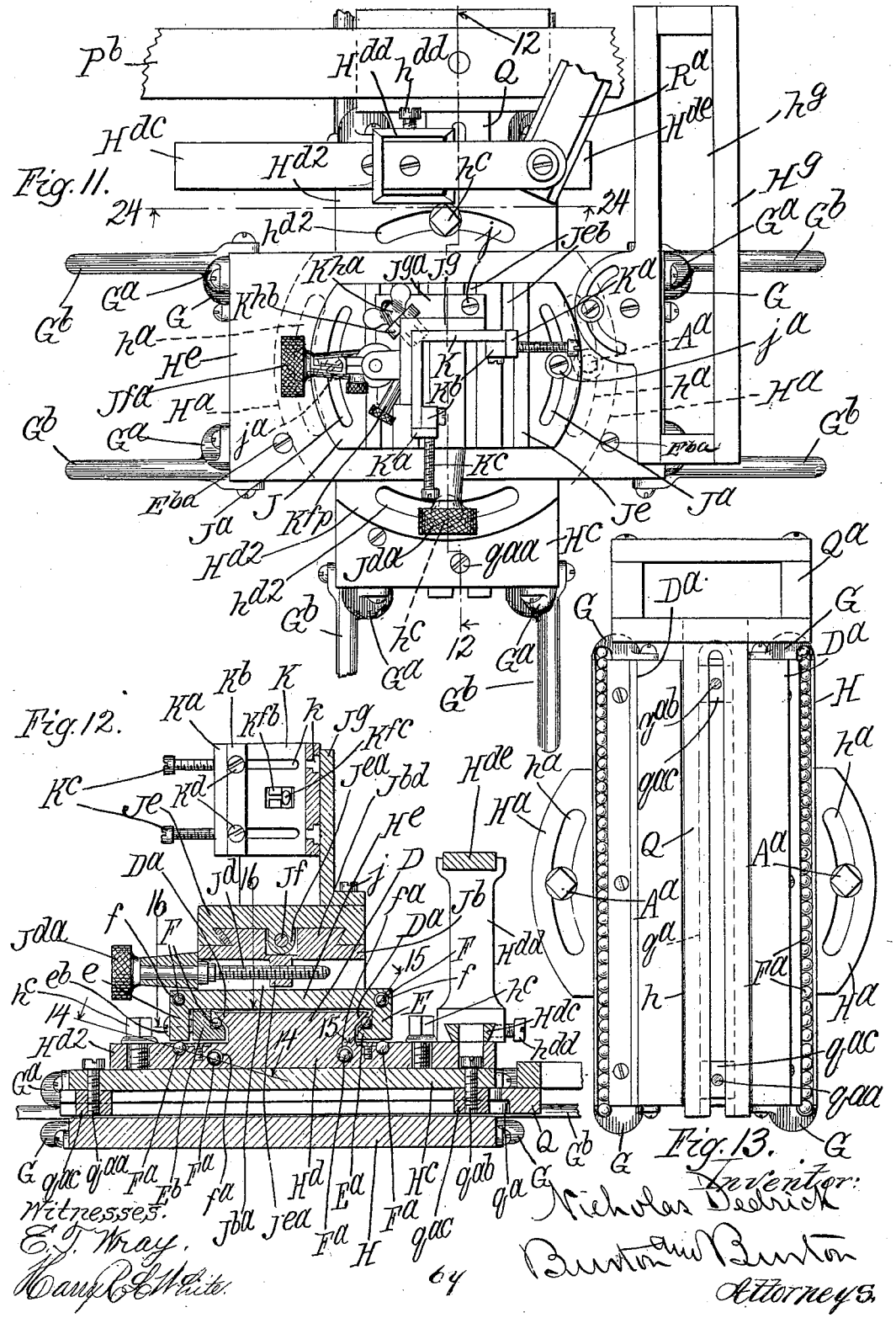

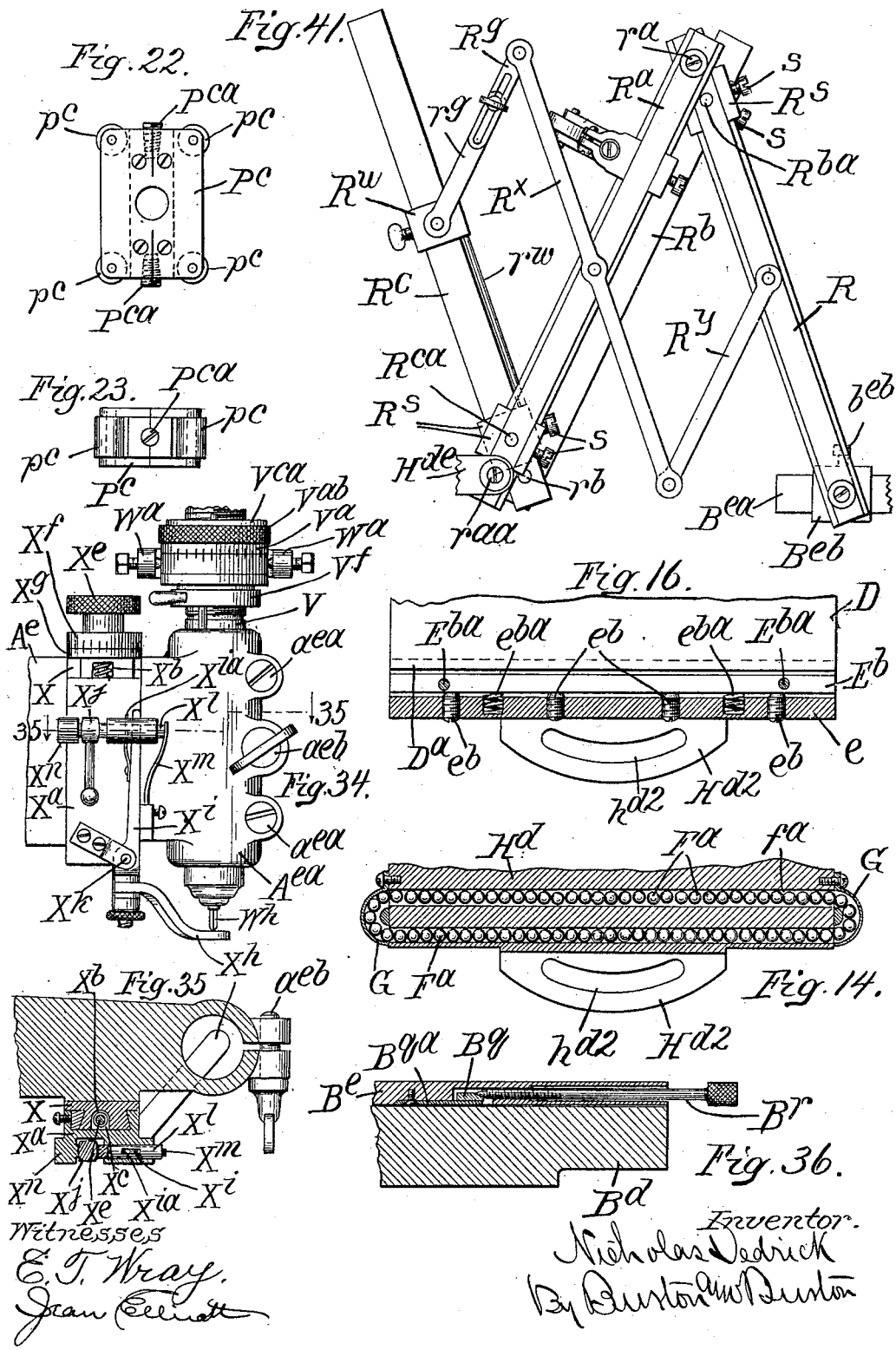

No. 614,845. Patented Nov. 29, 1898.
N. DEDRICK.
ENGRAVING MACHINE.
(Application filed Apr. 16, 1897.)
(No Model.) 10 Sheets—Sheet 8.
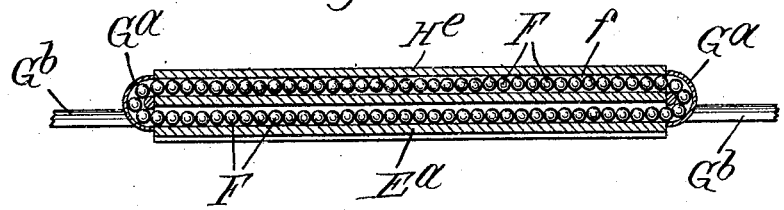
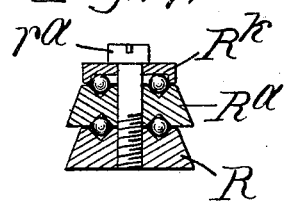
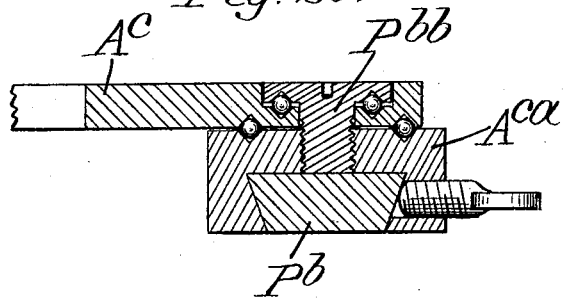
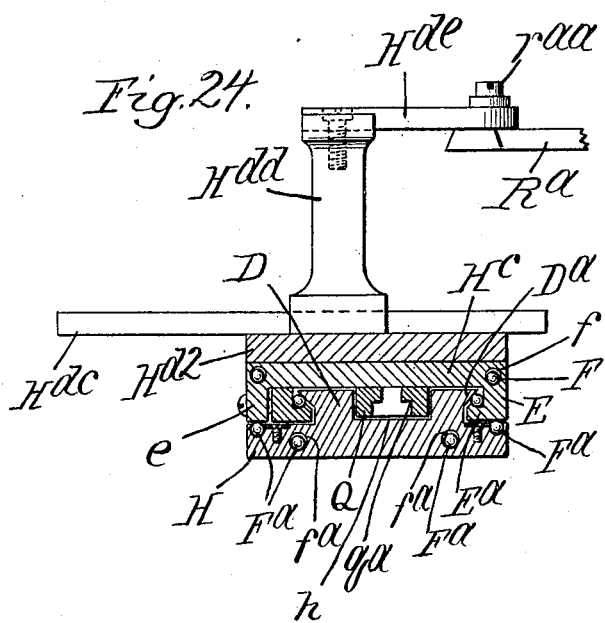
Witnesses.
E. T. Wray.
Jean Elliott
Inventor.
Nicholas Dedrick
by Burton and Burton
his Atty's
THE NORRIS PETERS CO., PHOTO-LITHO., WASHINGTON, D. C.

No. 614,845. Patented Nov. 29, 1898.
N. DEDRICK.
ENGRAVING MACHINE.
(Application filed Apr. 16, 1897.)
(No Model.) 10 Sheets—Sheet 9.
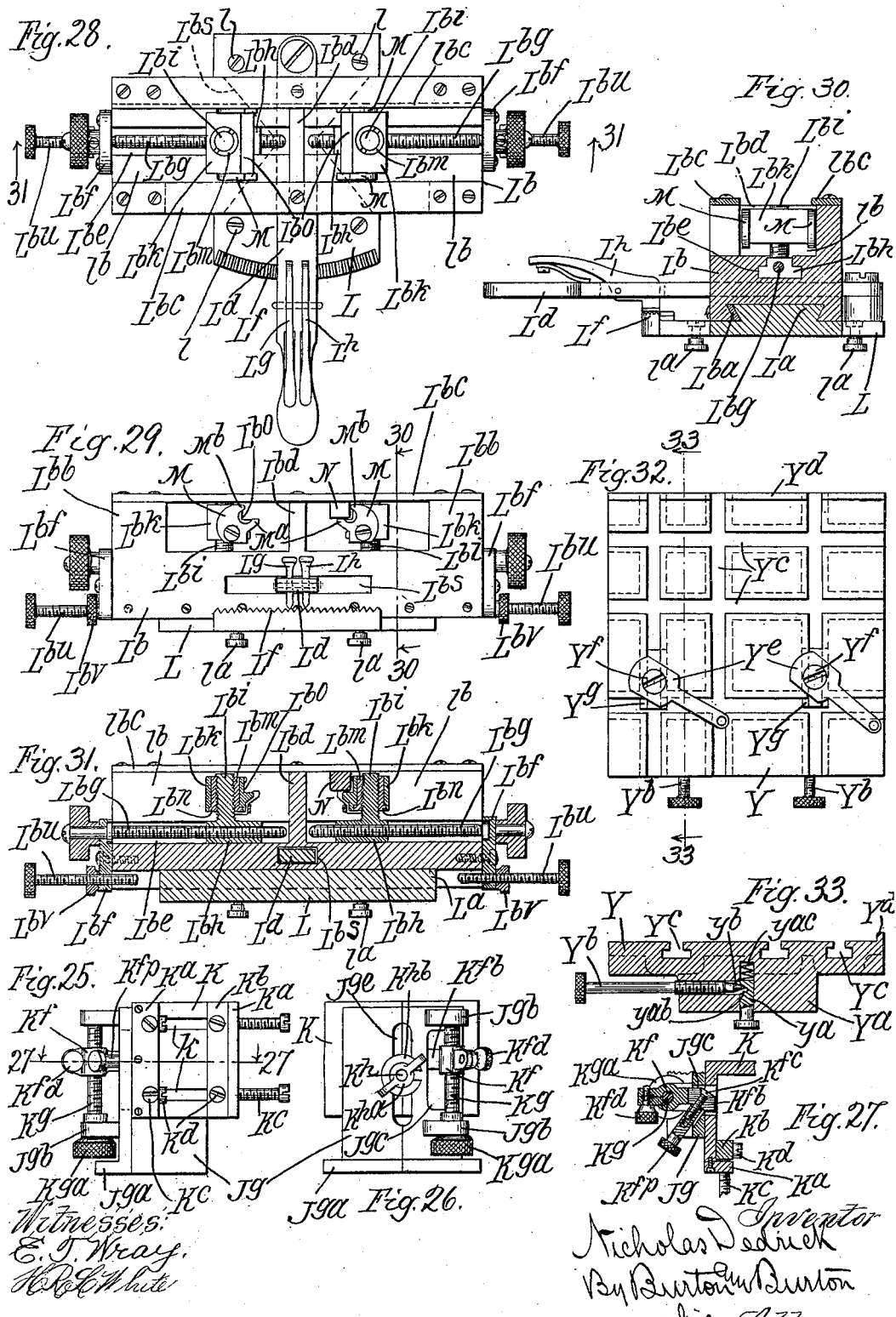

No. 614,845. Patented Nov. 29, 1898.
N. DEDRICK.
ENGRAVING MACHINE.
(Application filed Apr. 16, 1897.)
(No Model.) 10 Sheets—Sheet 10.
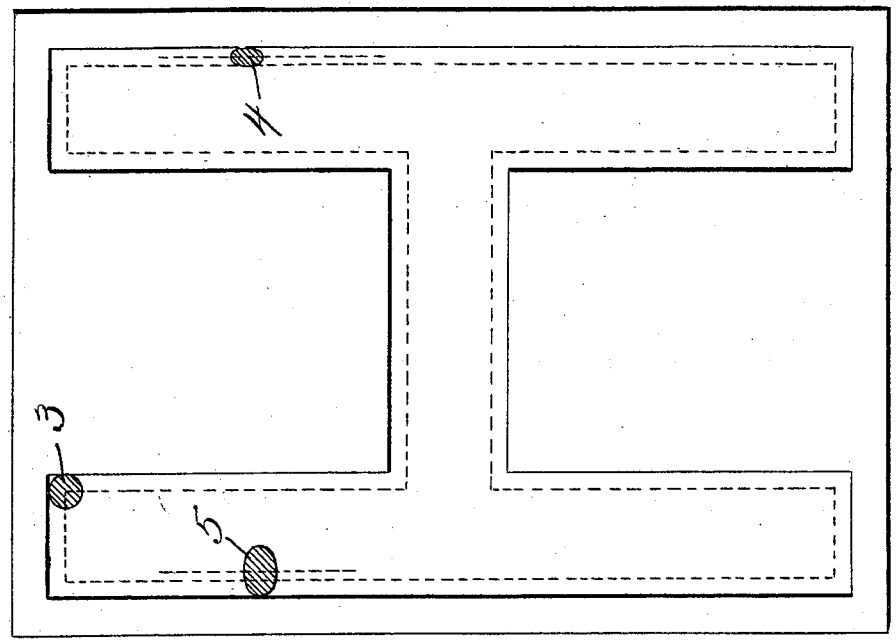
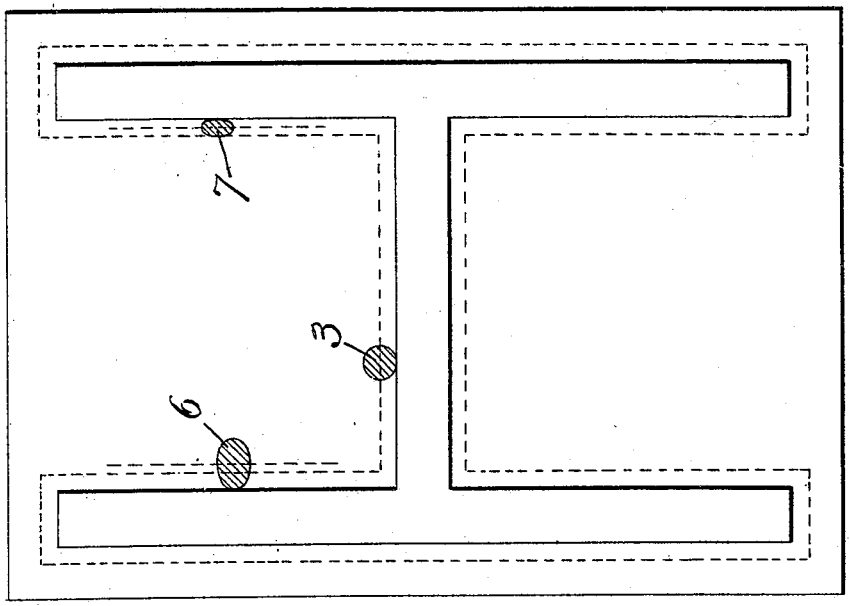
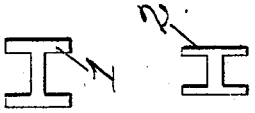
Witnesses.
E. T. Wray.
Jean Elliott
Inventor.
Nicholas Dedrick
by Burton and Burton
His Atty's.

UNITED STATES PATENT OFFICE.

NICHOLAS DEDRICK, OF CHICAGO, ILLINOIS.

ENGRAVING-MACHINE.

SPECIFICATION forming part of Letters Patent No. 614,845, dated November 29, 1898.

Application filed April 16, 1897. Serial No. 632,387. (No model.)

*To all whom it may concern:*

Be it known that I, NICHOLAS DEDRICK, a citizen of the United States, residing at Chicago, county of Cook, and State of Illinois, have invented certain new and useful Improvements in a Punch and Die Cutting and Engraving Machine, which are fully set forth in the following specification, reference being had to the accompanying drawings, forming a part thereof.

This invention relates to mechanism for cutting raised or intaglio designs in metal for the purpose of punches or dies or engraving-plates, and it is particularly designed for doing such work in the form necessary for the purpose of making printing-type, the dies being of the nature of matrices for use in type-casting machines, the punches being for use in sinking such dies by driving, as well understood. The particular class to which the invention belongs is that in which the course of the cutting-tool upon the block upon which it operates to produce the die or punch is guided and controlled by mechanism of the nature of a pantograph, with which there is associated a tracer which follows a pattern or templet, upon an enlarged scale, of the letter or other form to be produced in the die or punch.

In the drawings, Figure 1 is a general plan of a machine embodying my invention. Fig. 2 is a front elevation of the same. Fig. 3 is a side elevation of the portion of said machine constituting the pattern-holding stand and the tracer-carrier. Fig. 4 is an elevation, looking in the same direction as Fig. 3, of the tool and work carrying portion of the machine, the pantograph and lever connections therefrom to the tracer-head and the base being cut at an intermediate point between the two. Fig. 5 is a detail plan showing the pantograph and lever connections between the tracer-carrier and the work-carrier and said carriers adjusted to translate the fore-and-aft movements of the tracer into oblique movement of the work, as for producing an Italic letter from ortholineal design. Fig. 6 is a detail fore-and-aft axial section of the tool-holder head, showing the tool therein. Fig. 7 is a detail section at the line 7 7 on Fig. 6. Fig. 8 is a plan of a ball-controlling device for a ball-bearing in said head. Fig. 9 is an elevation of a coupling-sleeve on said head. Fig. 10 is a perspective of the tool-setting collar thereon. Fig. 11 is a detail plan of the work-carrier with a form of work-holder adapted for holding punch-blanks mounted thereon. Fig. 12 is a section at the line 12 12 on Fig. 11. Fig. 13 is a detail plan of the fore-and-aft slideway of the work-carrier. Figs. 14 and 15 are detail sections at the lines 14 14 and 15 15, respectively, on Figs. 2 and 12, showing certain endless tracks or courses for balls constituting antifriction-bearings for the sliders, said views illustrating also a construction which would be shown at the planes of the sections indicated on Figs. 3 and 4 by the lines 14$^a$ 14$^a$ and 15$^a$ 15$^a$ on said figures, the proportions or dimensions at such sections, however, not necessarily agreeing with those of Figs. 14 and 15. Fig. 16 is a detail section at the line 16 16 on Fig. 12. Figs. 17, 18, 19, 20, and 21 are detail sections at the lines 17 17, 18 18, 19 19, 20 20, and 21 21, respectively, on Fig. 1, showing the structure of the antifriction pivotal and sliding joints of the pantograph and lever systems which connect the sliders of the two compound beds. Figs. 22 and 23 are respective plan and elevation of a sliding pivot-block for certain lever connections. Fig. 24 is a detail section at the line 24 24 on Fig. 11. Fig. 25 is a detail front elevation of a work-holder for punch-blanks. Fig. 26 is a detail rear left-hand-corner elevation of the same. Fig. 27 is a detail section at 27 27 on Fig. 25. Fig. 28 is a plan of a work-holder suitable for holding die-blocks. Fig. 29 is a front elevation of the same. Fig. 30 is a section at the line 30 30 on Fig. 29. Fig. 31 is a section at the line 31 31 on Fig. 28. Fig. 32 is a plan of a holder for plates to be engraved or cut for patterns. Fig. 33 is a detail section at the line 33 33 on Fig. 32. Fig. 34 is a detail front elevation of the tool-holder head, showing a setting device thereon. Fig. 35 is a section at the line 35 35 on Fig. 34. Fig. 36 is a detail section at the line 36 36 on Fig. 3. Fig. 37 is an axial section of the tracer-holder. Fig. 38 is a perspective of a pivotal lifting-collar on the tracer-holding chuck. Fig. 39 is a detail section of gage stop-collar pertaining to a guiding device on the tracer-carrier traveler. Fig. 40 is an elevation of a latch associated therewith. Fig. 41 is a plan of the pantograph, showing an attachment thereto for the purpose of improving its action when adjusted for reducing at very large rates. Fig. 42 is a detail section of a coupling-joint in the liquid-duct which connects the tracer-holder with the tool-holder. Figs. 43 and 44 represent, respectively, a punch and matrix pattern and forms of tracer suitable for reproducing proportional, condensed, and extended production therefor. Fig. 45 illustrates a condensed and extended form of the same letter produced from the same pattern by the use of a circular tracer.

The general plan of my machine is as follows: Upon a rigid bed A, I support two sets of compound beds, the lower member of each set having movement in one direction on the base and the upper member having movement in a transverse direction upon said lower member, the upper member of one set having a head which carries a tracer and the upper member of the other set having a head which carries work—that is, a blank block or plate to be cut. On the same base A, I support a table which carries a pattern underneath the tracer, and on said base also I support a frame which carries a tool overhanging the work-holder. The corresponding travelers or sliding beds or plates of the two sets are connected, one set by simple lever connections and the other set by pantograph connections, said lever and pantograph connections having provision for adjustment on their respective pivots, so that the movement of each traveler of the set from which movement originates may be transmitted to the corresponding traveler of the other set, multiplied or reduced in a ratio independent of that which obtains in the transmission of the movement of the other traveler of the first set to its corresponding traveler in the second set.

Another feature consists in the transmission of vertical movement from the tracer which overhangs the pattern to the tool which overhangs the work, so that when the tracer is raised out of the pattern the tool will be raised out of the work, and when the tracer is depressed in the pattern the tool will be also depressed, such transmission of movement being effected by means of a liquid contained in a closed conduit which connects cylinders on the two heads, respectively, in which pistons connected to the tracer and tool-holder, respectively, operate.

Upon the base A there is secured a track-plate B, which is adjustable through a considerable angle each way from the direct fore-and-aft direction of tracks or guideways with which it is provided, and for the purpose of such angular adjustment said track-plate has the segmental apertures $b^a\ b^a$ in lateral flanges $B^a\ B^a$, and bolts $A^a\ A^a$ pass through said apertures, taking into the base A, as illustrated in Figs. 1, 2, 3, and 5.

$B^c$ is a traveler mounted above the track-plate B and having movement in the guideways of the track-plate. Upon the upper side of the traveler $B^c$ there is a track-plate $B^d$, which is secured to the traveler $B^c$, with capacity for angular adjustment through a considerable angle each way from a position at which its tracks or guideways are at right angles to the tracks or guideways of the track-plate B, flanges $B^{d'}\ B^{d'}$, having apertures $b^{d'}\ b^{d'}$, being provided to receive bolts $b^c\ b^c$, which take into the traveler $B^c$ and serve to secure the track-plate $B^d$, with its guideways, transverse to those of the track-plate B at any desired angle within the range of adjustment permitted by the extent of the segmental apertures $b^{d'}$. Upon the track-plate $B^d$ and adapted to have movement and be guided along its guideways or tracks is a second traveler $B^e$, and upon the upper side of this traveler is mounted the standard I of the tracer-holder hereinafter described.

I provide ball-bearings in the several tracks between the track-plates and the travelers designed to move thereon not only in the set of beds now being described, but in the other set hereinafter to be described, and the particular construction of these ball-bearings being substantially similar at all points at which they are employed the one description will answer for all, and similar letters of reference will be applied to similar parts in all these bearings so far as possible, and are illustrated in detail in Figs. 11, 12, 13, 14, 15, and 16.

In the construction of the tracks and the relation thereto of the ball-bearings provided therein I aim not merely to permit close adjustment without binding laterally—that is, in respect to horizontal movement—but also to retain the parts against separation vertically and prevent the possibility of vertical play, not relying upon the weight of the beds to prevent vertical movement. For this purpose upon each of the track-plates I form a broad rib D, having overhanging lateral flanges which are beveled at their under sides, and upon each of the travelers I provide depending lateral flanges E $e$, the flange E having horizontal inwardly-projecting flange $E^a$, and alongside the flange $e$ I secure to the traveler a gib $E^b$, in the form of a hanger rabbeted or L-shaped in cross-section, with a rabbet open upward and inward toward the downwardly-beveled or overhanging flange $D^a$ of the rib D at that side of the longitudinal rib D of the track-plate, said gib being adjustable laterally toward and from the rib D and secured by the screws $E^{ba}$ and stopped by means of screws $e^b$, set through the flange $e$ at that side. Between the overhanging downwardly-beveled flanges $D^a\ D^a$ and the underhanging inwardly-projecting flanges of the rib E and of the gib $E^b$, respectively, are located balls F F, &c., which thus obtain their tracks in the facing surfaces of said overhanging and underhanging parts, respectively; also, between the upper face of the track-plate B, outside the rib D and in the lower side or edge of the flange E, are provided tracks for other balls $F^a$ $F^a$, which take the direct load of the traveler on the track-plate, the balls F F, &c., serving to relieve the friction which will be due to lateral close adjustment of the parts, which is effected by the setting up of the gib $E^b$, and also to relieve the friction due to crowding and holding down the traveler onto the horizontal ball-tracks, which results from the lateral adjustment of the gib by reason of the oblique relation of the beveled ball-seats. In order that the gibs may be adjusted precisely without danger of binding them too tightly or indenting the balls in their seats, I provide springs $e^{ba}$, reacting between the gib and the side flange of the traveler. To set the gib properly, the screws $E^{ba}$ are loosened and the springs allowed to set the gib up against the balls. The screws $E^{ba}$ are then tightened and the screws $e^b$ are set up against the gib and hold it positively without reliance on the screws $E^{ba}$, which are useful simply to prevent the screw $e^b$ from crowding the gib when they are set up against it.

In order that the balls may not travel out of their tracks as the travelers reciprocate upon the track-plates, I form the ball-courses in an endless circuit, of which the ball-tracks above described constitute only one side, the remainder of the course being what may be termed an "idle" track—that is, a track in which no pressure or load is experienced by the balls. For the balls F F, &c., I form the return or idle track $f$ in the upper outer portion of the traveler, and for the balls $F^a$ between the horizontal tracks I form the return-path at $f^a$ in a position inward and downward from said horizontal tracks in the track-plate. For the purpose of connecting the two parallel portions of the endless course of the balls I secure to the ends of the track-plate the return-bends G G, and to the travelers, at each corner of the opposite ends, I secure the fittings having the return-bends $G^a$ $G^a$ and, in addition, the caps $G^b$ $G^b$, which cover the balls $F^a$ in the horizontal tracks where the traveler in its reciprocation toward one limit of its path on the track-plate would uncover a portion of the balls at the other end of the track-plate. This description will answer for all the ball-bearings which are formed between the track-plates and travelers thereof on both sets of beds and for the purpose of movements in both directions.

The work-carrier is constructed similar to the tracer-carrier and is illustrated in Figs. 1, 2, 4, 5, 11, 12, 13, and 24. H is a lower track-plate, having flanges $H^a$ $H^a$, provided with segmental slots $h^a$ $h^a$, for bolts $A^a$, which secure it with capability of angular adjustment to the base A. $H^c$ is the traveler, which has fore-and-aft movement on the track-plate H, and $H^d$ is the upper track-plate, secured with capability of angular adjustment upon the track-plate $H^c$ by bolts $h^c$, taking through segmental slots $h^{d2}$ in flanges $H^{d2}$. $H^e$ is the upper traveler, which has right and left movement over the track-plate $H^d$ and supports the work-holder, whose lower plate J is secured to said upper traveler $H^e$.

As above stated, the fore-and-aft movement of the lower traveler $B^c$ of the tracer-carrier is transmitted to the lower traveler $H^c$ of the work-carrier by lever connections. They are as follows: To the traveler $B^c$ there is secured a bar P, which projects rearward and is adjustable fore and aft, and at its rear end it has a cross-bar $P^a$, provided with a longitudinal slot $p^a$, in which an abutment mounted on the lower side of a lever $P^b$ obtains guidance. Said abutment, which is illustrated in detail in Figs. 22 and 23, consists of a frame or block $P^c$, having rolls $p^c$ $p^c$ $p^c$ $p^c$ at its four corners and split longitudinally for a distance from each end and having a tapering screw $P^{ca}$ set into it, adapted to spread it slightly at the split ends to keep the rolls $p^c$ against the sides of the slot $p^a$. The traveler $H^c$ is also provided with a rearwardly-projecting arm Q, said arm being also adjustable fore and aft in the traveler $H^c$ and having at its rear end a cross-head $Q^a$, in which a second abutment $P^c$, identical in all respects with the first and pivoted to the lever P, obtains guidance. The bars P and Q are adjustably secured in their respective travelers in the manner shown in Fig. 13, wherein the attachment of the bar Q is illustrated, and description of this bar will suffice for both. The bar is forked or divided by a slot which extends entirely to the forward end, but not to the rear end. The edges of the slot are rabbeted at $q^a$ and the traveler $H^c$ has a fore-and-aft groove $h$, in which the bar Q hangs, being fastened to the traveler $H^c$ by means of screws $q^{aa}$ and $q^{ab}$, which pass through the traveler from above and into the clamping-blocks $q^{ac}$, which are rabbeted and engaged in the rabbets $q^a$ of the bar Q. To the base A, at one of the several selected points, as at $A^b$, there is secured and adapted to be adjusted by rotation and sliding and to be made fast the arm $A^c$. To the end of this arm the lever $P^b$ is pivoted by means of a slide-block $A^{ca}$, which is directly pivoted to the bar $A^c$ and clamped onto the lever $P^b$. It will be understood that the connection thus effected between the lower traveler of the tracer-carrier and the corresponding traveler of the work-carrier causes the fore-and-aft movement of the former to be transferred to the latter, either reversed in direction or not, and modified in extent according to the position of the fulcrum of the lever $P^b$, which is adjustable at will by the means described.

For the purpose of communicating the right-and-left movements of the upper traveler of the tracer-carrier to the corresponding traveler of the work-carrier I provide pantograph connections which are illustrated in Figs. 1, 2, 3, 4, 5, and 24, as follows: To the top of said upper traveler of the tracer-carrier $B^e$ I secure by two rearwardly-projecting arms $b^{ea}$ $b^{ea}$ a bar $B^{ea}$, which extends parallel with the tracks or guideways which control the travel of said traveler in its track on the track-plate $B^d$, said bar being at the rear of the traveler, and being mounted on the upper side of the supporting-arm $B^{ea}$ it is a little higher than said traveler. On this bar $B^{ea}$ there is an adjustable pivot-block $B^{eb}$, provided with a set-screw $b^{eb}$ to secure it in adjusted position on the bar $B^{ea}$, and to said block is pivoted one end of the pantograph-lever R. The companion lever $R^a$ of the pantograph is pivoted to said lever R at $r^a$ at the rear ends of both said levers, and at the forward end said lever $R^a$ is pivoted at $r^{aa}$ to the end of an arm $H^{de}$, which is rigidly fastened at the top of the post $H^{dd}$, which is adjustably secured on the bar $H^{dc}$, which is made fast to the rear track-plate $H^d$, at the rear side thereof, and extends parallel with the tracks or guideways thereon. The post $H^{dd}$ is made fast in adjusted position on the bar $H^{dc}$ by a set-screw $h^{dd}$. $R^b$ and $R^c$ are companion pantograph-levers pivoted together at $r^b$ at their forward ends and having adjustable pivotal connection with the bars R and $R^a$, respectively, at $R^{ba}$ and $R^{ca}$, respectively. These adjustable sliding connections are made by sliding blocks $R^s$, having dovetailed slide-seats for the bars, respectively, and set-screws s, by which they may be clamped to their respective bars, two of such blocks being pivoted back to back, so that both blocks, being clamped to their respective bars and having pivotal motion with respect to each other, give such pivotal action about the same pivot to the bars to which they are respectively clamped. The pantograph system thus described being intended to transmit right-and-left movement from the upper traveler of the tracer-carrier to the upper traveler of the work-carrier, the pivot $r^{aa}$ being the fixed fulcrum of the pantograph for the purpose of such lateral movement and said fixed fulcrum having itself the fore-and-aft movement of the lower traveler, it becomes necessary to provide a connection from the pivot $r^b$ to the traveler $H^c$, which shall be suitable for moving said traveler laterally—that is, right and left—and at the same time shall accommodate the fore-and-aft movement of the pivot $r^b$, which it may derive from the fore-and-aft movement of the lower traveler. For this purpose I mount upon the traveler $H^d$ a bar $H^g$, having for purposes hereinafter mentioned capacity for angular adjustment with respect to said traveler, but designed in all ordinary use of the device to extend directly fore and aft—that is, at right angles to the right-and-left track of said traveler and having the longitudinal slot $h^g$, in which the pivot $r^b$ obtains fore-and-aft guidance, said pivot being extended through the levers which it connects and into a slide block or frame similar to $P^c$, which is provided with antifriction-rolls $r^{ba}$, which occupy the slot $h^g$. This pantograph mechanism, it will be understood, transmits the right-and-left movement from the upper traveler of the tracer-carrier to the upper traveler of the work-carrier, said movement being not reversed in direction, as in the case of the fore-and-aft movement transmitted between the lower travelers of said carriers, respectively, but being only modified in extent according to the adjustment of the pantograph elements, and since the fulcrum of the lever $P^b$, which transmits the movement of the lower traveler of the tracer-carrier to the corresponding traveler of the work-carrier, may be adjusted at will to reduce the movement to any degree, while the pantograph connections which transmit the transverse movements may be adjusted independently of the adjustment of the lever, so as to modify the transmitted movement to any different degree, it will be evident that a pattern which the path of the tracer mounted on the upper plate of the tracer-carrier might trace, would be transmitted to the work mounted on the upper traveler of the work-carrier, modified as to fore-and-aft directions in one ratio and modified as to right and left dimensions in an entirely different ratio. In addition to these modifications, which are independent of each other, it will be evident that if, for example, the lower track-plate of each of the carriers be adjusted to an oblique position on the bed, as seen, for example, in Fig. 5, so that the fore-and-aft movements of the travelers guided on said track-plates could not be directly fore and aft, but oblique, a directly fore-and-aft movement of the tracer mounted on the upper traveler of the tracer-carrier would be possible only because the said upper traveler would take, with respect to its track-plate, a right-and-left movement to accommodate and compensate for the right and left element of the oblique fore-and-aft movement of the track-plate of said upper traveler, which would move with the lower traveler in its oblique movement, and that therefore there would result to the work-carrier from such direct fore-and-aft movement of the tracer an oblique fore-and-aft movement of the work. This, it will be observed, would cause a fixed tool operating upon the work taking such movement to produce, for example, from an ortholineal letter-pattern which the tracer might follow an oblique or italicized letter design in the work. A similar result will be obtained by keeping the two travelers of both carriers at right angles to each other and setting the guides $H^a$ at an oblique angle to the traveler paths.

When the pantograph mechanism is set at proper position for reducing from the pattern to the work in a high ratio—as, for example, reducing to a scale one one-hundredth of the pattern—the pantograph-bar $R^b$ is necessarily set almost directly under the bar $R^a$, and the motion is communicated through levers by movements of the several bars in which the axes of the pivots which are moving toward each other or past each other or separated by a distance very much less than the diameters of the pivots. This cannot be illustrated visually with the pantograph set for reduction in so large a ratio as to involve the difficulty which in such case is experienced in its most acute form, but in Fig. 41 I have shown an adjustment to the pantograph such as to suggest the nature of the difficulty which would be experienced if the ratio were much greater. This difficulty consists, it will be seen, in that the power is transmitted by an extremely short lever-arm operating at an extremely disadvantageous angle, so that in a case where extreme accuracy is more essential than either the pantograph-arms are liable to spring and defeat such accuracy. To remedy this defect when such extreme adjustments of the pantograph are necessary, I provide a supplemental device, (shown in Fig. 41,) consisting of a lever $R^x$, fulcrumed at its middle point on the lever $R^a$ at $h$, the middle point of the latter, and having its forward end connected by the link $R^y$ to the middle point of the lever R, the rear end of the link $R^x$ being connected by an extensible link $R^g$ $r^g$ to a sliding pivot-block $R^w$, mounted on the lever $R^c$. The length of the lever $R^x$ between its extreme pivotal connections is equal to that of the lever R, and the link $R^y$ is half that length, so that from its pivot on the lever R the distance is equal to the pivotal connection of said link to the lever $R^x$ and to the pivot of the lever R on the block $B^{eb}$. The block $R^w$ is mounted on the bar $R^c$ at such point that the distance between the pivot of the link $R^z$ and the pivot of the lever $R^a$ to the lever $R^c$ is the half-length of the lever $R^x$ or the length of the link $R^y$. In order that this distance may be promptly determined without measurement, I secure to the pivot-block $R^w$ a spacing-rod $r^w$, which extends along one side of the lever $R^c$ and abuts against the slide-block $R^s$ on said lever $R^c$ when the block $R^w$ is at such distance from the block $R^s$ as to pass the pivots, as stated. Whenever the pantograph is adjusted for such great reduction as to make it desirable to employ this auxiliary appliance, it is put into place after the pantograph is adjusted, the two-part link $R^g$ $r^g$ being adjusted and having its parts secured together, so that the parts between the pivotal connections of said link to the block $R^w$ and the lever $R^x$, respectively, is equal to the distance between the pivotal connection of the levers $R^a$ and $R^c$ and the pivot of the lever $R^x$ to the lever $R^a$. Thus attached and adjusted it will be seen that the link $R^y$, lever $R^x$, and link $R^g$ $r^g$ serve to transmit the movement precisely in the same ratio as a mathematically exact action of the pantograph without the additional appliance would transmit it, but with the advantage that the power is directed and applied upon the lever $R^c$ by connection with a long arm of the lever—to wit, an arm whose length is the distance between the pivotal connections of the levers $R^a$ $R^c$ and the pivot of the link to the block $R^w$ instead of or rather in addition to the application of power also on the short arm of the lever, measuring from the pivot which connects the levers $R^b$ $R^c$ to the pivot which connects the levers $R^a$ and $R^c$, and thereby the movement is rendered easier and less liable to strain the pivots or spring the bars of the pantograph.

All the joints of the pantograph are provided with ball-bearings, so that they may be set tightly enough to prevent any play or lost motion without binding sufficiently either to cause the arms to spring or to render resistance too great. In case of the pivots which are adapted to be adjusted upon both the arms, which are pivoted together, the ball-bearings are formed as shown in Fig. 17, which is a section through the pantograph-levers R and $R^b$, the blocks $R^s$ $R^s$ having the circular V-shaped grooves $r^s$ facing each other and forming the counterpart seats for the balls therein. A washer $R^{sa}$, let into the bottom of the dovetailed channel in the lower block $R^s$ around the pivot, has its upper surface facing a circular groove in the bottom of the channel around a pivot-bolt, and said pivot-bolt $r^{sb}$, set through the washer and through the lower block, is screwed firmly into the upper block $R^s$ and may be set so that the balls take the wear properly. The pivot of the bar R to the block $B^{eb}$ represents another form of joint suited to this special situation. The upper side of the block and the lower side of the bar are provided with circular grooves about the pivot-bolt, and on the upper side of the bar there is a washer $R^k$, which faces a circular groove in the upper side of the bar, and the pivot-bolt $r$, set through the washer and the bar R, is screwed into the block and serves to seat the pivotal joint as closely as desired, the pressure of the adjustment being received by the balls. A third form of joint is formed between the bars $R^b$ and $R^c$, the pivot being guided in the bar $H^g$. This joint is shown in Fig. 18 and is as follows: The two bars are provided with the facing grooves, and the washer $R^j$ below the lower bar is provided with a groove which faces a like groove in the lower side of said bar, and the pivot-bolt $r^b$ takes through a slide block or frame $R^v$ precisely similar to the block $P^c$, which guides a pivot of the lever $P^b$ in the cross-bar $P^a$. (See Fig. 22.) The pivot-bolt $r^b$ has a flange $r^{ba}$ under the block or frame $R^v$, and said bolt has the shoulder $r^{bb}$, which stops against the under side of the washer $R^j$, and the bolt being screwed into the upper bar tightens the ball-bearings, as desired. Another style of joint is that shown in Fig. 19, which represents the pivot between the pantograph-bars R and $R^a$, which is similar to the joint shown in Fig. 21, the bar occupying the relation to the joint which in Fig. 21 is taken by the block $B^{eb}$, the bar $R^a$ having the relation to the joint which in Fig. 21 is occupied by the bar R. The upper washer $R^k$ is of the same form in both joints. The pivot between the bolt $R^a$ and the arm $H^{de}$ is identical in form with the joint last described. The pivotal connection of the lever $P^b$ to the arm $A^c$ by means of the sliding block $A^{ca}$ is constructed with ball-bearings, as seen in Fig. 20, the pivot-bolt $P^{bb}$ having a ball-track formed on the under side of its head facing a ball-track on the upper side of the arm $A^c$, said arm and the block $A^{ca}$ having ball-tracks facing each other, and the pivot-bolt being passed through the arm $A^c$ and screwed into the block $A^{ca}$. In all these joints it will be noticed that the entire friction of the pivotal action is on the balls which by their engagement with their annular tracks or seats determine the pivotal axis and center the parts about such axis without any friction on the bolt, which need not have any contact whatever with the parts which it penetrates.

The work-holder bed, which is illustrated in Figs. 1, 2, 4, 25, 26, and 27, comprises the lower track-plate J, secured on the top of the upper traveler $H^e$ of the work-carrier, being arranged to permit angular adjustment horizontally with respect to said traveler by the segmental slots $J^a$, through which the bolts $j^a$ take, by which it is secured to said traveler. The track or guideway of this plate is the dovetailed rib $j^b$, on which the fore-and-aft adjustable bed $J^b$ is mounted and adapted to slide, its movement on said track being controlled by the screw $J^d$, which is longitudinally stopped by the forward side of the track-plate $J^b$, and as to its threaded portion extends in a channel $J^{ba}$, formed longitudinally midway in the rib $j^b$, said screw taking into a lug $J^{ea}$, which projects down from the bed $J^b$ into said channel $J^{ba}$. The screw $J^d$ terminates in a milled head $J^{da}$, by which it may be operated at will to adjust the work-holder bed fore and aft. Upon the upper side of the sliding bed $J^b$ a transverse track or guideway $J^{bd}$ is formed, upon which the upper transverse sliding bed $J^e$ is mounted and guided transversely and operated at will by means similar to those described for operating the fore-and-aft sliding bed $J^b$, the rib or guideway $J^{bd}$ having a longitudinal channel midway of the rib, into which a lug $J^{ea}$ from the lower side of the sliding bed $J^e$ projects, while a screw $J^f$, longitudinally stopped on the left-hand side of the sliding bed $J^e$, extends in the groove and takes in the lug and has a milled head $J^{fa}$, by which it may be operated to adjust the work-holder bed transversely. The upper surface of the bed $J^e$ is provided with T-shaped or undercut channels $J^{eb}$, &c., for the purpose of securing rigidly in any desired position a work-holder.

For the purpose of holding a blank from which a punch is to be formed the work-holder may be such as illustrated in Figs. 11, 12, 25, 26, and 27. It comprises the vertical right-angular post or bracket $J^g$, which is secured by small bolts $j$ through its foot-flange $J^{ga}$, the lower swivel-heads of the bolts being engaged in the cross-heads of the undercut or T-shaped channels. K is a right-angular frame adapted to operate as a clamp to secure the blank, having flanges $K^a$ at each vertical edge and having within said flanges gibs $K^b$, which are adjustable to clamp the punch-blank in the work-holder, such adjustment being effected by screws $K^c$, set through the flanges $K^a$. $K^d$ are guide-screws set into the gibs and entering the slots $k\,k$ in the sides of the holder K to guide and retain the gibs as they are adjusted up against the block or blank. $K^f$ is a nut through which an adjusting-screw $K^g$ extends through journals in lugs $J^{gb}$, which project from one side of the angle-bracket $J^g$, such screw being provided with a thumb-head $K^{ga}$ at the lower end to rotate it to cause the nut $K^f$ to move up and down upon it. From this nut a finger $K^{fb}$ extends through a vertical slot $J^{gc}$ in the side of the post $J^g$ and into the adjacent side of the work-holder K. By this means when the screw $K^g$ is rotated the work-holding clamp K is adjusted vertically on the post $J^g$. The vertical adjustment of the work determines the depth of cut made by the tool, the variations of which, while very important, are exceedingly slight, being often microscopic, and it is necessary therefore that this adjustment should be accurate to the utmost possible degree, and for this reason all lost motion or play between the parts concerned in the movement should be avoided. To this end I split the end of the finger $K^{fb}$ which protrudes into the work-holding clamp K, and through the edge of that side of the latter I set a screw $K^{fc}$, which has a tapering head which enters the split in the finger $K^{fb}$, and by means of the cap-nut $K^{fp}$, which extends outside the bracket $J^g$, drawing the screw-head inward the finger is spread and caused to take hold of the work-holding clamp K rigidly and without play. For a similar purpose I split the nut $K^f$ outwardly from the threaded aperture and set a clamp-screw $K^{fd}$ through the parts to clamp them together and prevent any play on the thread of the screw $K^g$. The work-holding clamp K is made fixed and drawn firm in any position to which it is vertically adjusted by being bound at the angle into the angle of the post $J^g$, and for this purpose the post is slotted at $J^{gc}$ through the angle, and the stud-screw $K^h$, which protrudes as a stem from the work-holder clamp K, extends through said slot and receives a binding-nut $K^{ha}$ outside of a washer $K^{hb}$, which fits the outer angle of the post and receives the direct pressure of the nut by which the work-holder is clamped firmly into the corner of the post.

For the purpose of holding a block for a die or matrix for type-casting I prefer to employ the holder represented in Figs. 28, 29, 30, and 31. This die-holder comprises a base-plate L, which is adapted to be secured by the screws $l\,l$, coöperating with the flange-nut $l^a$, adapted to engage the T-shaped slots $J^{eb}$ of the bed $J^e$. On the base L is a dovetailed guide-rib $L^a$, on which the bed $L^b$ is adapted to slide right and left, customary provisions by means of a gib $L^{ba}$ being made for preventing lateral play at the slide-bearing. The bed $L^b$ has longitudinal chambers $l^b$ $l^b$, separated by the transverse bridge-plate or partition $L^{bd}$ in its upper side. The forward walls of the chambers are cut away between the ends and the partition $L^{bd}$, leaving standing the corner-posts $L^{bb}$ $L^{bb}$, said posts being connected by the top bar $L^{bc}$, which is secured also to the bridge-plate $L^{bd}$. A plate $l^{bc}$, secured on the upper side of the rear wall, overhangs the chamber and coöperates with the bar $L^{bc}$ to stop the matrix-blank upwardly, as hereinafter explained. In the bottom of each of the chambers throughout its entire length is formed an undercut or inverted-T-shaped channel $L^{be}$, and closing the ends of said channel there are secured fast to the ends of the bed $L^b$ plates $L^{bf}$ $L^{bf}$, through which are set and in which are journaled screws $L^{bg}$ $L^{bg}$, which extend longitudinally in the channels at opposite sides of the partition $L^{bd}$, and in said channels are travelers $L^{bh}$, through which the screws $L^{bg}$ take, respectively. Said travelers have each a stem $L^{bi}$, which is threaded and receives a jaw $L^{bk}$, designed to clamp the die block or blank against the middle partition $L^{bd}$. The purpose of threading the stem $L^{bi}$ of the travelers $L^{bh}$ is to permit vertical adjustment thereon of the jaws $L^{bk}$. Said jaws are necessarily non-rotatable on such stems, and such vertical adjustment is effected by providing in the jaws sleeves $L^{bm}$, having at their lower ends flanges $L^{bn}$, provided with corresponding seats in the lower ends of the jaws, said sleeves being threaded interiorly to receive the stems $L^{bi}$ and slotted or notched at the upper ends to adapt them to be rotated by a suitable tool to raise the jaws on the stems or permit them to descend.

The jaws $L^{bk}$ are rabbeted at $L^{bo}$, facing the partition $L^{bd}$, to receive the die-blanks, and at the front and rear ends of the jaws there are pivotally secured the cheeks M M, which operate as levers for causing the blanks to be set accurately in position gaged by their upper surfaces, in which the impression is to be cut, and against the bridge-plate, as will appear from the following description, to wit: Said cheeks have fingers $M^a$ and $M^b$, which project, respectively, upward and forward past the planes of the rabbet-faces, respectively, of the jaws, the pivots of said cheeks being below the horizontal plane of the finger $M^a$ and back of the vertical plane of the finger $M^b$. A blank from which a matrix is to be cut, (shown at N in Fig. 29,) made a little longer than the width of the chamber $l^b$, being entered under the bar $L^{bc}$ and lodged on the fingers $M^a$ with its inner end overhung by the flange $l^{bc}$, leans against the fingers $M^b$, so that as the jaw is advanced toward the bridge $L^{bd}$, the outer face of the block being brought up against the vertical face of the bridge, the blank, as the jaw further advances, is pushed back into the rabbet $L^{bo}$, forcing the fingers $M^b$ back, thereby tilting the lever-cheeks M on their pivots and causing the fingers $M^a$ to rise and carry the blank upward, whereby it is brought up snugly against a flange $l^{bc}$ and bar $L^{bc}$ at the same time that it is forced flat against the vertical face of the bridge $L^{bd}$. This insures the setting of the blanks in a position gaged accurately by the face which abuts against the bridge and the upper face which is to be cut, notwithstanding slight variations in the thickness and width of the blanks.

The two chambers of the matrix-holder are provided as a matter of economy, because the work which is done in producing, for example, a type-matrix cannot be begun and finished with the same tool, but must be first outlined, "roughened out" with one tool, and then finished with a finer tool, and since the setting of the tools requires great accuracy and consumes time it is desirable to avoid changing tools as much as possible. By mounting two blanks in the holder and two corresponding patterns on the pattern-table matrixes may be roughened out in both blanks with the same "roughing-out" tool and afterward finished with the same finishing-tool. When the matrix is being made by reduction from a pattern many times larger than the matrix, a reduction of one-fiftieth of the pattern being very frequently necessary in order to carry the work the distance necessary to bring the tool which has been working, for example, in the right-hand matrix into a proper position to work in the left-hand matrix, the matrix being of necessity cut with a good margin of metal between the depression and the edge of the block, the travel necessary to be given to the work-holder, including the total of both such margins on the matrix-block, added to the width of the bridge-plate $L^{bd}$, would be several times the lateral dimension of the letter and would necessitate, therefore, mounting the patterns corresponding to these two matrices at a distance apart on the pattern-table several times the entire width of the pattern. Thus for a letter one-sixteenth of an inch wide whose matrix might be cut from a pattern, say, four inches wide, the matrix depressions in the two blocks mounted in the work-holder being separated by an interval of probably not less than one-half an inch or eight times the width of the letter, would require the patterns to be separated on the pattern-table eight times the width of the pattern, or thirty-two inches. It will be recognized that this would require an altogether impracticable and prohibitive extent for the pattern-table and for the range of movement of the tracer-carrier traveler from which the lateral movement is communicated. In order to avoid this difficulty and yet be able to pass from one matrix to another without change of tool or mounting, I provide the devices which will now be described for shifting the die-holder on the work-carrier an amount corresponding accurately with the interval omitted from between the patterns on the pattern-table when said patterns are mounted, as they may be, close together instead of—for example, in the case supposed—thirty-two inches apart, so that such shift, having been made with the pantograph connections, will provide for the remainder of the interval which it is necessary for the work to be moved, such movement being the result of the movement of the tracer in passing over the adjacent side line of the patterns. This mechanism consists of a lever $L^d$, fulcrumed at its rear end on the base L and extending through the carriage $L^b$, which is slotted underneath the chambers, as seen at $L^{bs}$ in Figs. 28, 29, and 31, said slot being at the middle narrowed to the width of the lever, widening both ways from such middle point to the lateral edges. Upon the forward side of the base L is secured an upwardly-notched segment $L^f$, and to the lever $L^d$ are pivoted two dogs $L^g$ and $L^h$, adapted to engage the notches of the segment $L^f$. These notches are V-shaped and separated by V-shaped teeth, and the dogs, similarly V-shaped at their engaging noses, are so mounted in the lever that the distance between their points is not an exact multiple of the width of the notches of the segment, but being just perceptibly greater than a full multiple of that unit distance plus one-half the said unit. Stop-screws $L^{bu}$ are set through the plates $L^{bf}$ at both ends of the carriage $L^b$, which stop against the ends of the guide-rib $L^a$ of the plate L, said screws being provided with lock-nuts $L^{bv}$, binding against plates $L^{bf}$ to secure the stop-screws. These stop-screws are adjusted to allow to the carriage $L^b$ on the base-plate L when the operator desires to shift the carriage by means of the lever $L^d$ only the movement necessary to bring corresponding points in the two blanks under the tool before and after the shifting movement, when the tracer is carried from one pattern to a corresponding point on the other pattern. The dogs $L^g$ and $L^h$, having the function of locking the carriage at the position to which it is adjusted by the lever, accomplish that purpose fully by virtue of the fact that their V-shaped teeth are separated a distance which is not a multiple of the distance between consecutive teeth of the segment $L^f$. Manifestly if there were but one dog or if the two dogs were spaced a distance which is a multiple of the teeth-spaces the lever would be adapted to lock the carriage only at positions corresponding to the teeth-spaces and not at intermediate positions. With the construction described, however, wherever the carriage is set either one dog will exactly and fully engage a notch of the segment and the other will strike on the inclined side of a tooth and by the force of the spring tending to enter the notch adjacent to the tooth will take up any slack that might otherwise exist or both dogs failing to register exactly with notches of the segment will each enter part way and lodging upon oppositely-inclined faces will secure the carriage without play exactly in the position to which it has been carried by the lever before the dogs were dropped on the segment.

For the purpose of holding plates to be engraved or plates from which patterns are to be cut to be used on the pattern-table to control the cutting subsequently of matrices and punches I employ a work-holder (shown in Figs. 32 and 33) which comprises a bed Y, which is adapted to be secured on the upper sliding bed $J^e$ in the same manner as the other work-holders—that is to say, by a downwardly-headed bolt $y^a$, whose head engages in the undercut or T-shaped channels of the bed $J^e$. Since the upper ends of the bolts $y^a$ cannot be conveniently made accessible for the purpose of tightening them, I form the bed Y with a rib $Y^a$ on the under side, into which the bolts $y^a$ are seated, and into said rib from one side I set the screws $Y^b$, having taper-point at $y^b$, adapted to enter a lateral V-shaped notch $y^{ab}$ in each of the bolts $y^a$, so that by screwing in the screws $Y^b$ the bolts $y^a$ are forced upward and their heads at the lower ends are caused to bind in the T-shaped slots of the bed $J^e$. To facilitate disengagement, a small spring $y^{ac}$ may be lodged above the bolts $y^a$, tending to force them downward and relax the grasp of the heads upon the bed $J^e$. The upper side of the bed Y has undercut or T-shaped flanges $Y^c$ extending in two horizontal directions at right angles to each other, subdividing the face of the bed into rectangles, the channels being at different distances apart over the different parts of the bed for convenience in grasping plates of different sizes, and at one edge of the bed it has an upstanding flange $Y^d$. $Y^e$ are clamps which are connected by screws $Y^f$ to slides $Y^g$ in the undercut channels and adapted to be set and secured at any positions in said channels to adapt the clamps to bind the plate firmly between them and the lateral flange $Y^d$.

It is often desirable to cut plates or patterns mounted on the work-carrier from a design drawn on a sheet which may be mounted on the pattern-table. In such case evidently the skill of the operator must be employed to keep the tracer accurately following the lines of the drawing, the work being different in this respect from that which is required when a pattern is being followed whose channels or upraises absolutely guide the tracer. In such work—that is, following a drawing—irregular or curved lines can be traced only as the operator has skill to keep the tracer following the drawings; but straight lines fore and aft or right and left may be followed by means of guides with which I provide the tracer-carrier. In the drawings I have shown two separate devices having this purpose and accomplishing it in different ways, each adapted, respectively, for special lines of work. Upon each of the travelers of the tracer-carrier at the forward edge of the right-and-left traveler and at the right-hand end of the fore-and-aft traveler I mount in suitable lugs $B^h$ rods $B^i$, and on each of said rods I mount a plurality of adjustable clips or stops which are represented in Figs. 39 and 40 and comprise each a two-part collar $B^j$ $b^j$, provided with a set-screw $B^k$ for clamping it to the rod, and a disk $B^l$, retained between the two parts of the collar and rotatable thereon, the disk having a finger-lever $B^m$ and a stop-tooth $b^m$ at right angles to each other, as seen in Fig. 40, fixed with respect to the path over which the traveler moves, and midway between the extreme limits of the path of the traveler is the abutment $B^p$, which stands in the path of the tooth $b^m$ of the disk $B^l$ when said disk is set with the tooth projecting directly downward, the disk being adapted to be turned, however, so that the tooth will not collide with the stop as the traveler moves. When a design to be traced contains direct fore-and-aft lines, one of the clips of the right-and-left tracer will be set to collide with the abutment $B^p$ at a proper point to bring the tracer over said right-and-left line, and the operator can then trace such line by a direct fore-and-aft movement of the tracer only applying slight lateral pressure in a direction to hold the clip against the stop without the necessity for guiding the tracer steadily in its fore-and-aft travel. Similarly when a direct right-and-left line is to be traced a stop may be set on the fore-and-aft traveler in a position to collide with the abutment when the tracer is over the right-and-left line, and thereupon right-and-left movement may be given with slight pressure in a direction to hold the clip against the stop, with the result that the line will be accurately traced without requiring special steadiness of hand or accuracy of eye on the part of the operator. Another expedient for a similar purpose, but more useful in some situations and less useful in others than that described, is shown in Fig. 36. It consists of a clamping-wedge $B^q$, secured on a spring-finger $B^{qa}$ on the under side of each of the travelers of the tracer-carrier. A screw $B^r$ is set into the traveler from the edge parallel with the guideways and provided with a taper-point and adapted to operate upon the inclined face of the wedge to force it downward—that is, toward the track-plate on which the slider travels. By screwing inward the screw $B^r$ it will be seen that the traveler may be locked firmly to the track-plate, so that sliding movement in the direction afforded by such traveler will be prevented, and the tracer will thereby be able to follow only lines which correspond to the movement of the other traveler of the tracer-carrier. This device is particularly useful in tracing parallel lines, requiring, however, the resetting of the tracer for each line, the screw $B^r$ being withdrawn sufficiently to relax the wedge and permit the traveler thus bound to be moved to a new position to follow a new line, and then secured by driving in the screw $B^r$, as before.

I will now describe the tool holding and operating mechanism, which is illustrated in Figs. 1, 2, 4, 6, 7, 8, 9, and 10. At the left-hand end of the base A, I mount the rigid bracket $A^d$, having the vertical face $A^{da}$, provided with the guide-rib $A^{db}$, adapted to retain and guide the tool-carriage $A^e$, which may be vertically adjusted at its sliding engagement with the bracket $A^d$ by means of the screw $A^f$, which is provided with a lock-nut $A^{fa}$ above the lug $A^{de}$, rigid with the bracket and through which the screw passes and in which it operates when rotated to carry the carriage $A^e$ up or down. The carriage $A^e$ terminates at its end remote from the bracket in a split head $A^{ea}$, whose two members are provided with lugs for the clamping bolts or screws $a^{ea}$ $a^{ea}$ and a third thumb-screw $a^{eb}$ between them, whereby the split head may be adjusted so that the tool-holder may be retained without lateral play and guided in the head and may be removed without dissection. The tool-holder proper thus longitudinally guided in the head $A^{ea}$ comprises the sleeve V, which extends through the head $A^{ea}$ and has the rib $v$, which lodges in the rift of the split head $A^{ea}$, and is thereby prevented from rotating in said head and is adapted to be accurately held therein, as described. Said sleeve V extends above said head and receives the sleeve or collar $V^a$, which is screwed onto it, said collar being in two parts which form between them a seat for the ring $V^b$, which is embraced by and diametrically pivoted to the forked fingers $W^a$ of the lever W, which is fulcrumed at the rear of the head on the upper end of a short link $W^b$, whose lower end is connected pivotally to the upper end of the post $A^{ec}$, mounted rigidly to the rear end of the arm $A^{ed}$ of the head $A^{ea}$, the lever W thus serving as the instrument for lifting the tool-holder without interfering with the rotation of the sleeve or collar $V^a$. In order that there may be no possibility of play in the threads between the collar $V^a$ and the sleeve V, I employ a supplemental sleeve $V^c$, having a flange $V^{ca}$ overhanging the upper end of the sleeve $V^a$, the latter sleeve being recessed to receive the body of the supplemental sleeve, allowing an interval between the two, in which is lodged a coiled spring $V^{ac}$, which reacts between the two sleeves $V^a$ and $V^c$, both of which are screwed onto the same thread on the sleeve V. A pin $v^c$, set through the flange $V^{ca}$ in the sleeve $V^a$, holding the two sleeves relatively non-rotatable, causes the supplemental sleeve to act after the manner of a lock-nut in so far that the tension of the spring operates to take up all the slack in the threads, but without the characteristic of a lock-nut, so as to prevent easy rotation of the two sleeves together as one upon the sleeve V. Within the sleeve V, at the lower end, is a lining-sleeve $V^d$, which constitutes the lower journal-bearing of the rotating tool-carrier. It has a flange $V^{da}$ at the bottom, which abuts against the lower end of the sleeve V. The axial bore of the non-rotating lining-sleeve $V^d$ widens from about the middle of its length toward the lower end on a long taper, as seen at $V^{db}$. Within the sleeve V, at the upper part above the head $A^{ea}$, is a sleeve $V^e$, which serves as the upper journal-bearing of the rotating tool-carrier. It extends for some distance above the top of the sleeve V, and the pulley $V^l$ is journaled outside of it, and to its upper end, above the pulley, is screwed a collar $V^{ea}$, which constitutes the lower ball-seat of a thrust-bearing for the tool-carrier, which extends within the sleeve $V^e$ through said collar and is connected back to the pulley outside the collar by a sleeve-coupling $V^k$, as will appear. Within the sleeve $V^e$ and extending both above and below it is a rotating tool-carrier sleeve $V^f$, which at the lower end has the long taper enlargement $V^{fa}$, corresponding to the taper enlargement of the bore of the sleeve $V^d$, and affords an accurate journal-bearing for said tool-carrier, and at the extreme lower end of said sleeve $V^f$ its own axial bore is reduced at a short taper $V^{fb}$ to seat the tapered and split head of the tool-chuck $V^g$, which extends through the whole length of the tool-carrier and through whose entire extent the tool $V^h$ extends, protruding from both ends. The coupling $V^k$ comes into engagement with the hub of the pulley $V^l$ by means of corresponding projections and recesses at the proximate ends of said parts, as illustrated in Fig. 9, and in the chamber of the coupling, above the lower ball-seat $V^{ea}$, are housed the balls $V^p$, the upper ball-seat $V^m$, the adjusting-nut $V^n$ for taking up lost motion in said ball-bearings, and a spring $v^m$ for easing the ball-bearing without allowing it vertical slack motion. The adjusting-nut $V^n$ has the set-screws $v^n$ to secure it against rotation on the upper threaded end of the sleeve $V^f$ on which it is rotated to take up motion in the ball-bearings. The chuck $V^g$ has a collar or flange $V^{ga}$, which is rigid with it, and stands a little above the end of the hub $V^{ka}$ of the coupling $V^k$ when the chuck is forced down into the taper-seat, which causes it to grip the tool at the lower end, and onto the hub $V^{ka}$, which is exteriorly threaded, there is screwed the thumb-nut $V^x$, which, engaging above the flange $V^{ga}$, tends to crowd the chuck downward to make it grasp the tool. The upper end of the chuck is split and provided with the nut $V^w$ to close it up to grasp the tool at the upper end. $V^o$ is a cap apertured at the center of its head to admit the lower end of the nut $V^x$ and at its lower end screwed onto the hub of the pulley $V^l$, housing the coupling $V^k$ and the entire joint formed between the same and the pulley to prevent oil being thrown off by the rotation. When the tool is operating in the work, the upward pressure caused by the action of the work against it, tending to force upward the lower ball-seat $V^{ea}$, is received by the balls $V^q$, which are interposed between the lower flanged end of the sleeve $V^d$ and the ball-case $V^r$, which is screwed onto the lower end of the sleeve $V^f$ and has a sleeve-like flange $V^{ra}$, which extends up outside the flange $V^{da}$ and outside the lower end of the sleeve V, which is exteriorly rabbeted to receive said flange within the lower end of the head $A^{ea}$. This construction adapts the nut $V^n$ when screwed down on the upper threaded end of the sleeve $V^f$ to close up both ball-bearings described, which, it will be observed, are interposed simply to take the thrust, no easing device being necessary for the vertical journal-bearings which the rotating carrier $V^f$ obtains in the sleeve $V^d$ at the lower end nor at the upper end, where the bearing is obtained between the hub of the pulley $V^l$ and the outer surface of the sleeve $V^e$. Each of the ball-bearings is provided with a ball-carrier $V^s$, (illustrated in Fig. 8,) which is in the form of an angular cup, having apertures in its bottom plate, through which sufficient segments of the balls protrude to afford bearing upon the adjacent seat. It will be understood that the purpose of this device is merely to space the balls, obviating the necessity of making them fill the track and substituting for the friction which they would in that event have upon each other the very much less friction which the very slight weight of the cup causes upon them.

In the use of this machine it becomes necessary to set the tool with extreme accuracy as to its depth, so that in substituting a finishing-tool, for example, for the roughing-out tool the latter may reach and not materially cut below the surface cleared by the roughing-out tool, (except to the extent that the finishing-tool, set when inserted to the precise depth at which the roughing-out tool stood when about to be removed, will lengthen as it becomes heated with its work, and will thereby operate upon the surface cleared by the roughing-out tool simply to properly finish that surface.) For the purpose of such accurate setting of the tool I provide, mounted on the forward side of the carriage $A^c$ just to the left of the head $A^{ea}$, a setting device, which is illustrated, in connection with parts with which it coöperates, in Figs. 34 and 35, its general relation being also seen in Figs. 2 and 4. A vertical slide-bearing plate X is made fast to the forward side of the carriage $A^c$, and a vertically-adjustable slide block or carriage $X^a$ is suitably mated with said slide-bearing, with the usual provision for maintaining a close fit. A longitudinal channel at $X^b$ in the guide-bearing receives the lug $X^c$ in the sliding block or carriage, and a screw $X^e$, longitudinally stopped and journaled in the slide-bearing plate, takes into the lug and is thereby adapted when rotated to adjust the slide-block vertically. The screw $X^e$ has a flange $X^f$, which matches the flange or disk $X^g$, in which the screw is journaled on the slide-bearing plate, said flanges $X^f$ and $X^g$ having the coöperating parts of a micrometer-scale, as seen at the edge elevation of said flanges in Fig. 34, by which the adjustment effected by the screw $X^e$ may be accurately noted. The slide-block $X^a$ carries a foot or gage-finger $X^h$, secured to the end of a letter $X^i$, fulcrumed at $X^k$ on the slide-block, and on said block, at the forward side thereof, there is journaled the short shaft or thrust-pivot $X^l$, provided with the spring $X^m$, secured at one end on the block $X^a$ and acting at the other end on the end of the thrust-pivot $X^l$ with a tendency to thrust the latter through its bearing and toward a stop-lug $X^n$ in line with said bearing on the slide-block. The lever $X^i$ extends through the thrust-pivot, being provided with a spring-finger $X^{ia}$ to prevent lost motion or play with respect to the finger where it penetrates the latter. Between the lug $X^n$ and the bearing of the thrust-pivot $X^l$ a gravity-indicator $X^j$ is engaged, the lug $X^n$ at one side affording pivotal seat, while the end of the thrust-pivot at the other side affords an opposite seat, the spring $X^m$ operating with a tendency to cause the gravity-indicator to be frictionally held between said opposite pivotal seats. The entire device being adjusted by means of the screws $X^e$ to bring the gage-finger $X^h$ against the working point of a tool which is properly set at a depth at which it is desired to set a subsequently-inserted tool, said finger may be swung out of the way, turning on the lower end of the lever-stem $X^i$, and when a subsequent tool is inserted (the gage-finger being swung back into line under the tool and the indicator $X^j$ being lifted so that it projects horizontally and is held by friction between its pivotal seats, upon the tool being adjusted downwardly in the head by means hereinafter fully explained, until it rests upon the finger and exerts pressure thereon) the pressure of the lever $X^i$ on the thrust-pivot $X^l$ is thereby relieved, and the indicator-finger, being thus relieved of the pressure by which it is frictionally upheld, drops to a vertical position, thereby indicating instantly to the eye of the operator that the tool is adjusted to the desired point. In setting the tool in the head of the tool-holder it is first inserted through the chuck $V^g$ until it protrudes a suitable distance from the lower end of the chuck and is secured temporarily by the clamping-nut $V^w$ at the upper end of the chuck. The nut $V^x$, which has been detached from the hub of the sleeve $V^k$ and withdrawn with the chuck from the head, is now screwed onto said hub, the chuck having been inserted down through the sleeve $V^f$, and the nut, being thus screwed down on the hub, causes the tool to be grasped at the lower end of the chuck, as above described. The entire tool-holder, comprising the sleeve V, now holds the chuck and tool fixedly as to vertical adjustment with respect to said sleeve V, and for the accurate adjustment of the tool with respect to the head $A^{ea}$ the entire tool-holder is adjusted vertically with respect to the head $A^{ea}$ by means of the chambered sleeve $V^a$, provided with a milled rim $V^{ab}$, which is screwed onto the sleeve V and rotated by the hand of the operator to raise or lower the sleeve V, as necessary, to bring the tool to the desired depth. For the purpose of lifting the tool out of the work without changing its adjustment as to depth I provide on the lower end of the sleeve $V^a$ a collar $V^t$, having a handle $V^{ta}$ and stud-pins $V^{tb}$ $V^{tb}$, projecting downward and taking into sockets in the upper end of the head $A^{ea}$ to make the collar non-rotatable when said pins are engaged in the sockets. By means of the handle $V^{ta}$ the entire holder, comprising the sleeve V and the parts associated therewith, may be lifted in the head $A^{ea}$, the pins $V^{tb}$ being withdrawn from the sockets in the head in such lifting movement, so that a little rotary movement of the handle-collar causes the pins to support the holder-sleeve V by resting upon the upper end of the head $A^{ea}$, and while the entire tool-carrier is in this position, the tool being out of the work, the position of the tool-point may be taken by the gage or setting device, and, the tool being withdrawn for giving or substituting another, the same tool or another may be reset to the gage, and when the carrier is afterward lowered, the collar $V^t$ being turned to allow the pins $V^{tb}$ in the head, the tool will enter the work to the same depth as before.

The construction of the tool-clutch and clutch-holder as described serves several desirable purposes. The entire chuck and tool which extends from it and which is centered within it by the same means by which the chuck itself is centered in the chuck-holder—viz., by forcing the tapered and split end of the chuck into the tapered seat $V^{fa}$ at the lower end of the chuck-holder—can be withdrawn from the chuck-holder upwardly or by receding from the work and may be then mounted in a suitable grinding-machine for dressing the tool and after being dressed can be replaced again in the chuck-holder, with the certainty that the tool-center is in axis of rotation. The tool is centered for the purpose of dressing in the same seat and by the same means as for the purpose of use in the machine. One great difficulty experienced in the operation of this class of machines is to so grind the tools that they are centered at their working part about the axis about which they revolve in doing their work. To accomplish this heretofore, it has been customary to grind the tool in the holder, in which it is held while doing its work, and for this purpose in machines of this class heretofore the construction has been such that the spindle or holder within which the tool is centered and by which it is revolved and also the bearings in which such holder revolves have been made removable from the head, and the tool has been ground not only in the holder, but in the holder in the bearings. This necessitates not only expensive additions to the apparatus, but considerable delay in changing tools, all of which is avoided by the use of the long chuck to hold the tool, which is receivable and replaceable without disturbing the work and which is centered at the end at which the tool protrudes and at which it does its work by the same means which grips and centers the tool in the chuck. This involves providing means for gripping the tool at both ends of the chuck, because the grasp of the chuck at the lower end is released when the chuck itself is withdrawn from the holder and the chuck must have other grasp upon the tool, which is not released by withdrawing it. This consideration led to the structure shown and described and adapted to be used as stated.

The tracer-holder illustrated in Figs. 1, 2, 3, 37, and 38 requires particular description. The standard I, mounted on the upper traveler of the tracer-carrier, supports the crosshead $I^a$, mounted rigidly at the upper end of the standard and projecting forwardly, so that the tracer, supported as hereinafter described, at its forward end may overhang the pattern-table O, which is mounted upon the base A forward of the tracer-carrier. At the forward end the bar $I^a$ is offset upwardly at $I^{aa}$, and from the upper end of the offset extends again forwardly at $I^{ab}$, and in said terminal portion the tracer-head or gripping-chuck is secured. Two handles $I^b$ and $I^c$ are provided, projecting, respectively, to the left and to the right from the bar $I^a$, the former at the angle at the base of the offset $I^{aa}$ and the latter at the end of the terminal $I^{ab}$, so that the operator standing in front of the table O may operate the tracer, using both hands in order that a perfectly-controlled movement may be obtained with the tracer-point following the pattern secured upon the pattern-table. The tracer-head comprises a sleeve $I^d$, which is secured at its upper end in the terminal $I^{ab}$ of the bar $I^a$. The lower end of the sleeve $I^d$ is longitudinally split and exteriorly threaded, so that its split end is adapted to be closed up by the nut $I^e$, screwed onto the lower end of said split sleeve. Within the sleeve $I^d$, fitting closely at the upper end and adapted to be closely fitted at the lower end by the nut $I^e$ closing up the split end of said sleeve, is a second sleeve $I^e$, which extends considerably above the terminal $I^{ab}$ of the bar $I^a$. Within the sleeve $I^e$ there is telescoped the tracer-holding chuck $I^g$, whose stem projects above said sleeve $I^e$ and is provided with a thumb-nut $I^h$, by the rotation of which the chuck may be drawn upwardly in the sleeve $I^e$ or allowed to descend therein. At the lower end of the chuck $I^g$ it has an exteriorly-tapered boss $I^{ga}$, which is split to constitute the chuck-jaw, such tapering boss being adapted to seat in a countersunk or tapered bearing in the end of the sleeve $I^e$, so that the tracer inserted in the bore or central aperture of the chuck between the jaws formed by the split end may be gripped firmly by said jaws when the thumb-nut $I^h$ is rotated to draw the chuck $I^g$ upwardly in the sleeve $I^e$. The sleeve $I^e$ has an exterior longitudinal groove $i^e$, with which the screw $i^{fa}$, set through the collar $I^f$, engages and prevents rotation of the sleeve $I^e$ while permitting its longitudinal adjustment when the set-screw $i^f$ is loosened. Above the terminal $I^{ab}$ of the bar there is mounted on the sleeve $I^e$ a collar $I^f$, secured thereto by the set-screw $i^{fa}$ and adapted to be adjusted longitudinally with respect to said sleeve. The collar $I^f$ has V-shaped points $I^{fa}$ projecting from its lower side in an axial fore-and-aft plane, and from its upper side it has similar V-shaped points $I^{fb}$ projecting in an axial right-and-left plane. To the bar $I^a$, there is secured the upstanding post $I^k$, at the upper end of which there is fulcrumed a lever $I^l$, whose forward end is forked at $I^{la}$ and embraces between its fork-fingers the sleeve $I^e$ above the collar $I^f$. To a lug $I^{da}$, opposite the handle $I^c$ on the terminal $I^{ab}$ of the bar $I^a$, there is pivoted a finger-lever $I^m$, which extends above the terminal $I^{ab}$ and is bent downward at the right-hand side thereof past the handle $I^c$, being apertured to accommodate the sleeve $I^e$ and said handle, and upon the upper side of said finger-lever $I^m$ the downwardly-projecting points $I^{fa}$ of said collar bear, while the upwardly-projecting points $I^{fb}$ of said collar bear against the under side of said forked fingers $I^{la}$ of the lever I.

$I^s$ is a spring-actuated dog or latch which is pivoted on the handle $I^c$, the spring $I^t$ reacting between the finger-lever of said latch and said handle to hold the latch in position, so that its shoulder or tooth is engaged under the collar $I^f$. This construction is designed to enable the operator to hold the handle $I^c$ with the right hand to guide the tracer in the pattern and with the fingers of the same hand simultaneously to operate the lever $I^m$ to raise the tracer, which is then automatically locked up by the dog $I^s$, which may be disengaged at will to allow it to drop again to the pattern.

Rearwardly of the post $I^k$ on the bars $I^a$ there is mounted a cylinder $I^r$, in which a piston $I^y$ plays, said piston being pivotally connected to a yoke $I^x$, which is clamped onto the lever $I^l$.

On the arm $A^{ed}$ of the tool-carrying head $A^e$ there is mounted a cylinder $W^z$, having within it a piston whose stem $W^y$ protrudes from the upper end of the cylinder, and has a cross-bar $w^y$, to which are attached the upper ends of tension-springs $W^x$ $W^x$, whose lower ends are attached to the arm $A^{ed}$ and tend to hold the piston downward in the cylinder. A spring $W^w$, connected at the lower end to the bar $A^{ed}$ and at the upper end to the yoke $W^v$, operates to hold said lever-arm downward toward the arm $A^{eb}$.

Z Z Z is a jointed duct whose joints at $Z^a$ $Z^a\ Z^a$ are liquid-tight, which constitutes a communicating passage between the two cylinders $I^r$ and $W^z$. (See Figs. 1, 2, 3, 4, and 42.) The space underneath both pistons and the communicating duct being fully occupied with liquid, one of the pistons being above the lower limit of its range of movement in the cylinder, it will be understood that when that piston is depressed the piston in the opposite cylinder will be lifted an equal amount if the two cylinders are of equal diameter or a different amount, according to the relative sizes of the cylinders. The cylinders are illustrated as of equal diameter, and for ordinary purposes this is the desirable construction.

It will be noticed that the connection of the pistons to the levers, which are operated by and operate the tracer-holder and the tool-holder, respectively, is arranged so that the elevation of the tracer depressing its piston and raising the piston which operates upon the tool-holder will cause the latter to be raised. Since it is not necessary to give quite so great range of vertical movement to the tool as may be given to the tracer, the upper end of the piston $W^y$ need not be in contact with the under side of the lever W when said piston is at the lower limit of its path in the cylinder, the tracer being thus permitted to rise a short distance before the liquid connection begins to lift the tool. Obviously, however, this play is not essential, and the ratio of the vertical movement of the tracer and tool holder may be determined by the relative sizes of the cylinders, the larger cylinder being provided where the shorter movement is desired. The joints $Z^a$ are simple liquid-tight couplings illustrated in Fig. 42, wherein the two sections of pipe Z Z are united by a coupling similar to a stuffing-box $Z^b$, which is screwed onto the peripherally-threaded flange $Z^c$ of one of the pipe-sections and binds upon the back of the flange $Z^d$ of the other section, antifriction-balls $Z^e$ being interposed and a gasket of suitable material, as leather, being bound between the faces of the two flanges $Z^c$ and $Z^d$, said faces having annular beads $Z^f\ Z^f$ opposite each other, by which the gasket is compressed into corrugated form and prevented from kinking in the action of the joint.

When machines of this character are used for producing type or type-matrices by reduction from enlarged patterns and to produce from the same pattern both a proportional reduction—that is, in which the reduction is the same in both dimensions—and also a reduction or reductions to produce what are known as condensed or extended type—that is, those in which the horizontal dimension is reduced or increased relatively to the vertical dimension—there results a change in character or style of the letter which is not intentionally involved in the condensation or extension. This change is that the reduction or increase of the horizontal dimension takes effect on the breadth or weight of the individual vertical lines of the letter as well as upon the breadth of the letter as a whole, so that, for example, a letter which, produced by a proportional reduction from the pattern, has its vertical and horizontal lines of equal weight when produced in a manner to be condensed will have its vertical lines lighter than its horizontal lines. Such an effect is illustrated in Fig. 45, which shows at No. 1 a letter produced by proportional reduction, having its horizontal and vertical lines of equal weight, and, in comparison therewith, at No. 2 a letter similar in style—that is, from the same pattern but made by adjustment of the machine adapted to condense the letter. Such change in style is not the purpose of condensing or extending, and, in a measure, this change defeats that purpose, which is to provide varieties of type in series or sets adapted to be used together with harmonious effect, which results from the obvious unity of style running through all the varieties. To avoid this result, which is one of the most serious defects in the use of this class of machines, I employ a tracer whose cross-section at the plane at which it abuts against the pattern-walls is oblong, preferably elliptical, the difference in the two dimensions being such as to approximately compensate for the difference in the ratio of reduction of the two components of the tracer's movement provided for in the setting of the machine. The effect of this feature will be best understood by bearing in mind that when the tracer is following the abutting lines or walls of the pattern the path of the axis of the tracer is the real pattern which is reproduced by the tool at its point and that the path of the point of the tool is the outline of the printing-face of the letter produced. The relative weights of the horizontal and vertical lines are preserved practically unchanged in case of cutting a condensed matrix from a letter-pattern by making the excess of the fore-and-aft over the right-and-left diameter of the tracer bear to the difference between the fore-and-aft diameter and the width of the fore-and-aft line-space in the pattern the ratio of condensation, and for cutting a condensed punch by making the excess of the right-and-left over the fore-and-aft dimension of the tracer bear to the sum of the width of the fore-and-aft line on the pattern and the right-and-left dimension the ratio of condensation, and in case of cutting an extended matrix by making the excess of the right-and-left over the fore-and-aft dimension of the tracer bear to the difference between the width of the line-space on the pattern and said fore-and-aft dimension the ratio of extension, and in case of cutting an extended punch by making the excess of the fore-and-aft over the right-and-left dimension of the tracer bear to the sum of said fore-and-aft dimension and the width of the fore-and-aft line of the pattern the ratio of extension. This method of constructing and using a tracer is illustrated in Figs. 43 and 44 of the drawings, wherein a block or Gothic letter H is taken as an illustration. In reducing proportionally the tracer-point will be circular, and may have, for example, the diameter of a circle 3. The actual path followed by the tracer-axis in a pattern for a matrix is indicated by the dotted line in Fig. 43. For condensing the letter, say, one-fifth, in order to avoid condensing the vertical lines the tracer will be in cross-section of the oval form shown at 4, whereby it is able to travel with its axis nearer the side lines of the vertical-line space of the letter, and so obtain a range of right-and-left movement, for the purpose of working out the width of the vertical-line space in the matrix, greater than the circular tracer has to the extent of the difference between the diameter of the circular tracer and the reduced right-and-left diameter of the oval tracer. If this excess is the fraction of the whole width of the line which is expressed by the ratio of condensation, such condensation will be compensated thereby. It will be understood that the greatest diameter of the oval tracer will be the diameter of the original circular tracer, since, otherwise, the horizontal lines would be affected. If an extended matrix is to be cut from the same pattern, the tracer will be made in cross-section of the form shown at 5, the right-and-left diameter being increased above the diameter of the original circular tracer (which latter diameter remains the lesser diameter of the oval tracer) an amount which bears to the entire width of the line-space the ratio of extension, for thereby the tracer is able to follow a path farther removed from the side wall of the vertical-line space of the pattern than that followed by the circular tracer to the extent of the increased radius, and is thereby able to compass in its work a cavity less in width than the circular tracer compassed by the amount of the increase in diameter; and if this increase is the fraction of the width of the line-space which is expressed by the ratio of extension compensation is effected. In Fig. 44 a punch-pattern is shown, and without further analysis it will be understood that since the actual area compassed by the tracer is in this case the sum of the width of the line-rib or upraise of the pattern and the diameter of the tracer the conditions are reversed in the manner expressed above, in this figure the circle 3, as before, representing the cross-section of the circular tracer, the circle 6 representing the cross-section of a tracer for producing a condensed pinch, and 7 the cross-section of a tracer for producing an extended punch. It will be seen that for letters whose vertical lines are not all of the same weight or breadth, and especially in letters having curve shades or swell shades in straight lines, this expedient of an oval tracer affords only approximate compensation for the error resulting, as pointed out in the use of the machine for making condensed or extended punches or matrices. By treating, however, the average width of the several lines or of the lines of varying width as the width to be considered and making the tracer of a diameter suitable for such assumed average width it is possible, with rare exceptions, to so far compensate for the error in question as to make that error unnoticeable to the eye.

I claim—

1. In a punch or matrix cutting or engraving machine an actuating and an actuated carrier, each having two travelers, whose movements are transverse to each other, one traveler of the actuated carrier being carried by the other traveler of the same carrier, movement-communicating connections from the two travelers respectively of the actuating-carrier to the actuated carrier, the travelers of one of the carriers being relatively adjustable to vary the angle between their respective movements.

2. In a punch or matrix cutting or engraving machine an actuating and an actuated carrier, each having two travelers, whose movements are transverse to each other, one traveler of the actuated carrier being carried by the other traveler of the same carrier, movement-communicating connections from the two travelers respectively of the actuating-carrier to the actuated carrier; the travelers of one of the carriers being relatively adjustable to vary the angle between their respective movements, said movement-communicating connections being independently adjustable to vary the ratios between the communicating and communicated movements.

3. In a punch or matrix cutting or engraving machine an actuating and actuated carrier each having two travelers, whose movements are transverse to each other, one traveler of the actuated carrier being carried by the other traveler of the same carrier, movement-communicating connections from the two travelers respectively of the actuating-carrier to the actuated carrier, the travelers of both the carriers being relatively adjustable to vary the angle between their respective movements.

4. In a punch or matrix cutting or engraving machine an actuating and an actuated carrier, each having two travelers whose movements are transverse to each other, one traveler of the actuated carrier being carried by the other traveler of the same carrier, movement-communicating connections from the two travelers respectively of the actuating-carrier to the actuated carrier, the travelers of one of the carriers being relatively adjustable to vary the angle between their respective movements, a pattern-supporting table asssociated with the actuating-carrier, and a cutting-tool, a means for holding and driving the same, and a tracer-holder connected to the first carrier and the work-holder connected to the second carrier.

5. In a punch or matrix cutting or engraving machine, an actuating and an actuated carrier, each having two travelers whose movements are transverse to each other, and one of which carries the other, movement-communicating connections to the actuated carrier from the travelers respectively of the actuating-carrier, the travelers of one of the carriers being relatively adjustable to vary the angle between their respective movements.

6. In a punch or matrix cutting or engraving machine an actuating and an actuated carrier, each having two travelers whose movements are transverse to each other, and one of which carries the other, movement-communicating connections to the actuated carrier from the two travelers respectively of the actuating-carrier, the travelers of one of the carriers being relatively adjustable to vary the angle between their respective movements, said movement-communicating connections being independently adjustable to vary the ratios between the communicating and communicated movements.

7. In a punch or matrix cutting or engraving machine an actuating and an actuated carrier, each having two travelers whose movements are transverse to each other, and one of which carries the other, movement-communicating connections between the corresponding travelers of the two carriers, the travelers of one of the carriers being relatively adjustable to vary the angle between their respective movements.

8. In a punch or matrix cutting or engraving machine an actuating and an actuated carrier, each having two travelers whose movements are transverse to each other, and one of which carries the other, movement-communicating connections between the corresponding travelers of the two carriers, the fulcrum of one system of connections being on the base which supports both carriers and the fulcrum of the other system being on one of the travelers of the first carrier.

9. In a punch or matrix cutting or engraving machine an actuating and an actuated carrier, each having two travelers whose movements are transverse to each other, independent systems of connection for transmitting movement from the travelers respectively of the actuating-carrier to the corresponding traveler of the actuated carrier, the fulcrum of one system being on the base which supports both carriers and the fulcrum of the other system being on one of the travelers of the first carrier, the travelers of one of the carriers being relatively adjustable to vary the angle between their respective movements.

10. In a punch or matrix cutting or engraving machine an actuating and an actuated carrier, each having two travelers whose movements are transverse to each other and one of which carries the other, independent systems of connections for transmitting movement from the travelers respectively of the actuating-carrier to the corresponding traveler of the actuated carrier, the fulcrum of one system being on the base which supports both carriers and that of the other system being on one of the travelers of the first carrier, the two travelers of each carrier being relatively adjustable to vary the angle of their respective movements.

11. In a punch or matrix cutting or engraving machine an actuating and an actuated carrier, each having two travelers whose movements are transverse to each other and one of which carries the other, movement-communicating connections from the two travelers respectively of the actuating-carrier to the actuated carrier, the fulcrum of one system of said connections being on the base which supports both carriers and that of the other system being on one of the travelers of the first carrier, in combination with a work-holder on the actuated carrier, and a tool-holder overhanging the work-holder.

12. In a punch or matrix cutting or engraving machine an actuating and an actuated carrier, each having two travelers whose movements are transverse to each other and one of which carries the other, independent systems of movement-communicating connections between the corresponding travelers of the two carriers, the fulcrum of one system being on the base which supports both carriers, and that of the other system being on one of the travelers, connected by the first system in combination with a work-holder on the actuated carrier, a tool-holder overhanging said work-holder and a support for the same independent of the work-holder carrier, and mechanism on said tool-holder frame for giving the tool a working movement.

13. In a punch or matrix cutting or engraving machine an actuating and an actuated carrier, each having two travelers transverse to each other, one of which carries the other, lever connections from one of the travelers of one carrier to the corresponding traveler of the other carrier, pantograph connections from the other traveler of the first carrier to its corresponding traveler of the second carrier, the fulcrum of the pantograph being on one of the lever-connected travelers, and one of the traveler connections of the pantograph being a shifting pivot suitably guided with respect to the traveler to which it pertains.

14. In a punch or matrix cutting or engraving machine an actuating and an actuated carrier, each having two travelers whose movements are transverse to each other, two systems of connection to the actuated carrier, extending from the two travelers respectively of the actuating-carrier, one of said systems being a pantograph, having its fulcrum on one of the travelers connected by the other system, one of the other traveler connections of the pantograph being a shifting pivot, provided with a guideway, which is angularly adjustable on the traveler to which it pertains.

15. In a punch or matrix cutting or engraving machine, an actuated and an actuating carrier, each having two travelers, whose movements are transverse to each other and one of which carries the other, a lever connection from one of the travelers of one carrier to the corresponding traveler of the other carrier, pantograph connections from the other traveler of the first carrier to the corresponding traveler of the second carrier, the fulcrum of the pantograph being on one of the lever-connected travelers, and one of the other traveler connections of the pantograph being a shifting pivot, having a guideway, which is angularly adjustable on the traveler to which it pertains.

16. In a punch or matrix cutting or engraving machine in combination, an actuating and an actuated carrier, each having two travelers transverse to each other, and one carrying the other; lever connections from one of the travelers of one carrier to the corresponding traveler of the other carrier; pantograph connections from the other traveler of the first carrier to the corresponding traveler of the second carrier, the two travelers of the actuated carrier being adjustable relatively to each other to vary the angle of the vertical planes of their respective movements, the fixed fulcrum of the pantograph being on the lever-operated traveler of the actuated carrier, and one of the traveler connections of the pantograph being a shifting pivot having a guideway adapted to be fixed with respect to the traveler to which it pertains.

17. In a punch or matrix cutting or engraving machine, in combination, an actuating and an actuated carrier, each having two travelers transverse to each other, and one carrying the other; lever connections from one of the travelers of one carrier to the corresponding traveler of the other carrier; pantograph connections from the other traveler of the first carrier to the corresponding traveler of the second carrier, (the two travelers of the actuated carrier being adjustable relatively to each other to vary the angle of the vertical planes of their respective movements;) the fixed fulcrum of the pantograph being on the lever-actuated traveler of the actuated carrier, and the other traveler connection being a shifting pivot having a guideway which is angularly adjustable on the traveler to which it pertains.

18. In a punch or matrix cutting or engraving machine, in combination, an actuating and an actuated carrier, each having two travelers transverse to each other, and one carrying the other; lever connections from one of the travelers of one carrier to the corresponding traveler of the other carrier; pantograph connections from the other traveler of the first carrier to the corresponding traveler of the other carrier, each carrier having its two travelers adjustable to vary at will the angle between the vertical planes of their sliding movements; the fixed fulcrum of the pantograph being on the lever-operated traveler of the actuated carrier and one of its other traveler connections being a shifting pivot suitably guided with respect to the lever to which it pertains.

19. In a punch or matrix cutting or engraving machine, in combination, an actuating and an actuated carrier, each having two travelers transverse to each other, and one carrying the other; lever connections from one of the travelers of one carrier to the corresponding traveler of the other carrier; pantograph connections from the other traveler of the first carrier to the corresponding traveler of the second carrier; the fixed fulcrum of the pantograph being on the lever-operated traveler of the actuated carrier, and one of the other traveler connections of the pantograph being a shifting pivot suitably guided with respect to the traveler to which it pertains, and a work-holder on the actuated carrier and a tool-holder in a fixed frame overhanging said carrier.

20. In a punch or matrix cutting or engraving machine, in combination, an actuating and an actuated carrier, each having two travelers transverse to each other, and one carrying the other; lever connections from one of the travelers of one carrier to the corresponding traveler of the other carrier; pantograph connections from the other traveler of the first carrier to the corresponding traveler of the second carrier; the fixed fulcrum of the pantograph being on the lever-operated traveler of the actuated carrier, and one of the other traveler connections of the pantograph being a shifting pivot suitably guided with respect to the traveler to which it pertains; and a work-holder on the actuated carrier and a tool-holder in a fixed frame overhanging said carrier; and mechanism on the fixed frame for giving the tool a working movement.

21. In a punch or matrix cutting or engraving machine, in combination, an actuating and an actuated carrier; each having two travelers transverse to each other, and one carrying the other; lever connections from one of the travelers of one carrier to the corresponding traveler of the other carrier; pantograph connections from the other traveler of the first carrier to the corresponding traveler of the second carrier; a fulcrum for the pantograph, which is adjustable and adapted to be fixed on the lever-operated traveler of the actuated carrier; the connection of the pantograph to the operating-traveler of the other carrier being similarly adjustable.

22. In a punch or matrix cutting or engraving machine, in combination, an actuating and an actuated carrier, each having two travelers transverse to each other and one carrying the other; lever connections from one of the travelers of one carrier to the corresponding traveler of the other carrier; pantograph connections from the other traveler of the first carrier to the corresponding traveler of the second carrier; the fixed fulcrum of the pantograph being on the lever-operated traveler of the actuated carrier, one of the other traveler connections of the pantograph being a shifting pivot suitably guided with respect to the traveler to which it pertains; the pivotal connections of the lever which communicates motion between corresponding travelers of the two carriers being adjustable with respect to said travelers respectively.

23. In a punch or matrix cutting or engraving machine, a work-holder comprising a post angle-shaped in horizontal section and a similar angle-shaped clamp for the work, an adjusting-screw journaled on the post and a nut carried thereby having a finger which engages the clamp to raise and lower the latter on the post, and suitable means for securing the same to the post at adjusted position.

24. In a punch or matrix cutting or engraving machine, a work-holder comprising a post angle-shaped in cross-section and a similar angle-shaped clamp for the work, an adjusting-screw on the post and a nut carried thereby having a finger which engages the clamp to raise and lower the latter on the post, said post being slotted vertically at the angle, and the clamp having a threaded stem which protrudes through the slot, and a clamping-nut thereon adapted to bind against the outside of the corner of the post to draw the clamp into the angle.

25. In combination with the upstanding post and the work-holder clamp adapted to be vertically adjusted and secured on the post; the adjusting-screw journaled on the latter, and the nut which it carries having a finger which takes into the clamp to carry the same with the nut as the screw is rotated, such finger being split longitudinally where it enters the clamp; a screw having tapered shoulder set through the split finger, and suitable means for forcing it longitudinally to cause the tapered shoulder to spread the split finger, whereby the finger is made to engage the clamp without play.

26. In combination with the upstanding post and the work-holder clamp adapted to be vertically adjusted and secured on the post, the adjusting-screw journaled on the latter and the nut which it carries having a finger which takes into the clamp to carry the same with the nut as the screw is rotated, such finger being split longitudinally where it enters the clamp; a screw having a tapered head set through the finger from the inner side at the split, and a nut screwed onto its protruding end, whereby the tapered head may be drawn into the split to spread the finger to cause it to firmly engage the clamp.

27. In a punch or matrix cutting or engraving machine, in combination, the track-plates and their respective travelers; the track-plates having a longitudinal rib provided with lateral overhanging flanges, the traveler having flanges which project inwardly and underhang the flanges of the rib, and antifriction-balls interposed between said flanges of the rib and traveler respectively.

28. In a punch or matrix cutting or engraving machine, in combination, the track-plates and their respective travelers; the track-plates having an upraised guide-rib, and lateral marginal surfaces provided with ball-tracks parallel with the upraised rib, said rib having overhanging underbeveled edges, and the slider having flanges which underhang such beveled edges and overhang the ball-tracks in the lateral margins of the track-plates, and balls in such tracks and also between the overhanging beveled edges of the rib and the underhanging flanges of the traveler.

29. In a punch or matrix cutting or engraving machine, in combination, the track-plates and their respective travelers; the track-plates having an upraised guide-rib and lateral margins provided with ball-tracks parallel with the rib, the rib having overhanging underbeveled edges and the traveler having flanges which underhang such beveled edges and overhang the ball-tracks in the lateral margins, balls in such tracks and also between the beveled edges of the rib and the underhanging flanges of the traveler, one of the latter being on a gib which is secured to and adjustable relatively to the traveler.

30. In a punch or matrix cutting or engraving machine, in combination with the track-plates and their respective travelers, the gib in the slide-joint between track-plate and traveler, and springs reacting between the gib and one of said parts to force it toward the other; screws which secure it to the part against which the springs react, said screws being adapted to be relaxed to allow the springs to set the gib and to be then tightened to make the gib rigid with said part.

31. In a punch or matrix cutting or engraving machine, in combination with a tracer-head and the holder adapted to be reciprocated longitudinally in the head; the tool-head and the tool-holder adapted to be longitudinally reciprocated therein; a chamber on the tracer-carrier and a chamber on the tool-carrier, and pipe connections between the chambers said chambers being closed except at their communication with each other, and, together with their connecting-pipe, being occupied by a substantially incompressible fluid; means on the tracer-head for transmitting, and on the tool-head for receiving, pressure through the liquid, and connections from such transmitting and receiving means to the tracer-holder and the tool-holder respectively; whereby the vertical movements of the tracer are communicated through a liquid to the tool.

32. In a punch or matrix cutting or engraving machine, in combination with a tracer-head and the tracer-holder reciprocating therein, the tool-head and the tool-holder reciprocating therein; a piston and cylinder on the tracer-carrier, and a piston and cylinder on the tool-carrier; connections from the pistons respectively to the tracer-holder and tool-holder, and pipe connections adapted to contain liquid, extending between the cylinders, whereby liquid therein constitutes means of communicating the vertical movement of the tracer to the tool.

33. In a punch or matrix cutting or engraving machine in combination with an actuating and actuated carrier each having two travelers whose movements are transverse to each other; movement-communicating connections from the travelers, respectively, of the actuating-carrier to the actuated carrier; the tracer-head supported by the actuating-carrier and a tracer-holder reciprocating therein; a work-holder on the actuated carrier; a tool-carrier overhanging the work-holder, and the tool-holder reciprocating in the tool-carrier; cylinders on the tracer-carrier and on the tool-carrier respectively; pistons reciprocating in said cylinders, and connections therefrom to the tracer-holder and to the tool-holder, respectively; whereby liquid in the pipe connection between the cylinders communicates the vertical movements of the tracer-holder to the tool-holder throughout the varying horizontal movements of both holders.

34. In a punch or matrix cutting or engraving machine, in combination with a tool-head, a tool-carrier extending vertically through the head and adapted to be made non-rotatable with respect to the head; the tool-chuck and the rotatable holder for the same extending axially through the non-rotatable carrier; a driving-pulley connected to said rotatable holder above the non-rotatable carrier, and a lever fulcrumed on the tool-head and connected to the non-rotatable carrier above the head and below the pulley, whereby the entire tool-carrier with the tool-holder and tool therein may be vertically adjusted in the head regardless of the rotation of the tool.

35. In combination with a tool-head, the tool-carrier $V$, which penetrates the head axially; a two-part collar $V^a$ $V^c$, both parts being screwed onto the carrier $V$, and the spring $V^{ca}$ reacting between said two parts $V^a$ and $V^c$, and a lever fulcrumed on the tool-head and engaging the two-part collar with capacity for carrying it longitudinally without interfering with its rotation.

36. In combination with the tool-head, the tool-carrier $V$ extending therethrough, the collar $V^a$ screwed onto the carrier above the head, and means for engaging such collar to give it longitudinal movement without interfering with its rotation; a handled collar $V^t$ rotatable on the carrier below the collar $V^a$; stud-pins $V^{tb}$ in the collar $V^t$, and sockets in the tool-head adapted to receive the stud-pins.

37. In combination with the tool-head and a tool-carrier $V$ extending therethrough, the tool-chuck holder extending longitudinally through said carrier; the pulley journaled outside the upper portion of said holder; a coupling $V^k$ rigidly secured to the end of the tool-chuck holder which protrudes above the pulley and the carrier, and having a chamber in its under side and making driving connections at its lower end with the pulley, and a suspending device $V^o$ connected to the pulley and extending outside the coupling $V^j$ and adapted to hang thereon; and a ball-bearing interposed in the chamber of the coupling $V^k$, the upper ball-seat being stopped longitudinally on the chuck-holder, and the lower ball-seat being stopped longitudinally on the carrier.

38. In combination with the tool-head and the tool-carrier extending therethrough; the tool-chuck holder extending through the carrier and provided with a ball-bearing at the lower end stopping the upward thrust; a ball-bearing at the upper end stopping the downward thrust of the weight; a coupling secured to the upper end of the chuck-holder above the upper ball-seat of the upper bearing and extending down outside said bearing, and a driving-pulley journaled outside the carrier below said bearing and engaging with said coupling.

39. In combination with the tool-head the tool-carrier extending therethrough; the tool-chuck holder extending through the carrier and provided with a ball-bearing at the lower end stopping the upward thrust; a ball-bearing at the upper end stopping the downward thrust or weight; a coupling secured to the upper end of the chuck-holder above the upper ball-seat of the upper bearing and extending down outside said bearing, and a driving-pulley suspended from said coupling and journaled outside the carrier below said upper ball-bearing, and suitably engaged with the coupling to drive the same as the pulley rotates.

40. In combination with the tool-head, the tool-carrier extending therethrough; the tool-chuck holder journaled vertically in the tool-carrier and extending therethrough; ball-bearings at the lower end which receive the upward thrust of the chuck-holder against the carrier; ball-bearings at the upper end of the carrier, the upper ball-seat thereof being longitudinally movable on the chuck-holder; a stop-disk adjustable longitudinally and adapted to be secured on the chuck-holder, and a spring interposed between the same and said upper ball-seat.

41. In a punch or die cutting or engraving machine, in combination with the tool-head, the tool-chuck holder journaled and centered therein and having an inwardly-facing tapering shoulder $V^{fb}$ at the lower end of its cavity, the tool-chuck extending through the holder and having its lower end split and tapered to correspond with the shoulder $V^{fa}$; a tool extending through the chuck and protruding therefrom beyond the holder at the lower end, and suitable means for crowding the chuck endwise in the holder, whereby it is simultaneously centered and caused to grip the tool.

42. In a punch or matrix cutting or engraving machine, in combination with the tool-carrier, the tool-chuck holder journaled and centered therein and having an upwardly inwardly facing seat or shoulder $V^{fb}$ at the lower end of its axial cavity, the tool-chuck split or tapered at its lower end to correspond with said seat or shoulder; the chuck having a rigid collar $V^{ga}$ at the upper part, and a nut encompassing the collar screwed onto the upper end of the chuck-holder below said collar $V^{ga}$ and having a shoulder which engages above the latter; whereby the rotation of the nut forces the chuck down in the holder to seat its tapered end in the seat $V^{fa}$.

43. In a punch or matrix cutting or engraving machine, in combination with the tool-carrier, a tool-chuck holder journaled and adapted to be centered and rotated in the carrier; the chuck extending longitudinally within the chuck-holder and having its lower end conically tapered and split and provided with a corresponding seat in the chuck-holder and being split and provided with a compressing-nut at the upper end; and a nut having a threaded connection with the upper end of the chuck-holder and adapted to be engaged above an abutment on the chuck, whereby the rotation of the nut tends to force the chuck downward in the holder and simultaneously center the chuck and grip the tool there at the lower end, and the entire chuck is removable from the holder without disturbing the adjustment of the tool therein.

44. In combination with the tool-carrier, the tool-chuck longitudinally journaled therein; abutments stopped with respect to the chuck and with respect to the carrier, respectively, for thrust bearings; the annular ball-case $V^s$ comprising a disk apertured to allow segments of the balls to protrude through it, said case and balls therein being interposed between the abutments at such thrust bearings.

45. In a matrix-cutting machine, a matrix-holder having an upper gage or stop adapted to receive the matrix-blank under it, and a vertical wall adapted to have blanks set up against it; and the clamping-jaw which is adapted to be advanced horizontally toward the vertical wall and vertically toward the upper stop-plate; whereby the blank is set and clamped with respect to one vertical side and the upper face regardless of its width or depth.

46. In a matrix-holder, in combination with an upper horizontal gage or stop, and a vertical wall into the angle between which the blank is adapted to be set; a clamp adapted to be advanced horizontally toward the vertical wall comprising the blank-supporting lever M, horizontally pivoted and provided with the fingers $M^a$ and $M^b$, on and against which respectively the blank is lodged, the pivot being below the horizontal plane of the former finger; whereby the advance of the jaw against the vertical wall causes the blank to be forced upward against the upper stop of the holder.

47. In a matrix-holder, in combination substantially as set forth, the carriage $L^b$ adjustable longitudinally and having two chambers separated by the vertical partition $L^{bd}$; travelers having longitudinal movement in said chambers respectively toward and from said vertical partition, and screws by which the travelers are advanced toward and withdrawn from said partition, said travelers comprising suitable clamping-jaws to bind the matrix-blank against the partition; means for shifting the carriage longitudinally, and adjustable stops to limit the extent of such longitudinal shifting movement.

48. In a matrix-holder, in combination substantially as set forth, the base L and the carriage $L^b$ adjustable transversely with respect to the base and provided with two matrix-seats at opposite sides of the middle, adjustable stops to limit the movement of the carrier transversely on the base; the lever $L^d$ for shifting the carriage transversely; the notched segment on the base and the two dogs on the lever adapted to engage the notches of the segment, the points of the dogs being separated by a distance which is not an exact multiple of the distance between consecutive notches of the segment.

49. In combination, substantially as set forth, the carriage $L^b$; the traveler $L^{bh}$ therein; the screw $L^{bg}$ for operating the carrier; the jaw $L^{bk}$ and the sleeve $L^{bm}$ screwed onto the vertical stem of the traveler and adapted to receive and support the jaw; whereby the jaw is adjustable vertically and horizontally without rotation.

50. In an engraving-machine, in combination with the work-carrier, a plate-holder having the bolts $y^a$ adapted to engage the work-carrier bed, and having a lateral tapering notch; and a screw $Y^b$ having a taper-point adapted to enter the notch to draw the bolt into engagement with the bed.

51. In combination with the track-plates and the travelers having horizontal movement thereon, respectively; ball-courses between the corresponding ball-faces in the track-plates and travelers respectively, such ball-courses being extended to comprise return-bends at both ends merging in return-courses formed in one of the parts in which the relative movement at the ball-tracks occurs; whereby said ball-courses are made endless.

52. In combination with the track-plate and the traveler thereon provided with courses for ball-bearings at their facing bearing-surfaces; the return-bend fittings constituting continuations of the ball-courses at the end of their bearing-tracks, respectively, said return-bends being secured to one of the parts between which the movement occurs, and being segmentally cut away facing the bearing-face of the other part.

53. In combination with a pantograph adjustable at the pivotal connections of its bars to vary the ratio in which it transmits motion, the supplemental lever $R^x$ pivoted to one of the intermediate bars of the pantograph, and the links which connect the ends of the lever to the outer bars; one of said links being adjustable in length at will and having its pivot on the outer bar adjustably mounted thereon at a distance from the other adjustable pivot on said bar equal to the length of that arm of the lever $R^x$ to which said link is connected.

54. In combination with the pantograph comprising the levers $R$ and $R^a$ pivoted together, the end of the lever remote from their pivot being the pantograph-fulcrum, said pantograph comprising the adjustable levers $R^b$ and $R^c$ pivoted together; a supplemental lever $R^x$ pivoted to the lever $R^a$ and from one end linked to the lever $R$, the distance of the pivotal connections of the link and lever $R^x$ from the pivotal connections of said link and lever to the levers $R$ and $R^a$, respectively, being equal, a link connecting the opposite end of the lever $R^x$ to the lever $R^c$, the pivotal connection of said link to the last-mentioned lever being adjustable on said lever and said link being extensible, to cause the link to be parallel to the lever-arm $R^a$.

55. In combination with the tool-head, the tool-holder adjustable in the head; a gravity-drop adapted to be frictionally upheld, and a gage-finger adapted to be interposed below the tool, and connections from the finger to the friction-bearing of the gravity-drop, whereby the pressure of the tool upon the gage-finger relaxes the frictional grasp and causes the drop to fall.

56. In combination with a tool-head, the tool-carrier vertically movable in the head, and means whereby it is held normally depressed; an adjustable stop to limit the depression, and the tool adjustable longitudinally relatively to the carrier; and means for sustaining the carrier at unvarying distance above the limit determined by the stop which arrests its depression; and a gage adapted to be interposed below the tool and vertically adjustable on the head; whereby the carrier and tool being upheld out of the work, the gage may be set at the working point of the tool, and after being removed, may be reset to the same point by the gage, and thereby adapted to reach its original level in the work when the carrier is depressed to working position.

57. In combination with a tool-head, the tool-carrier vertically movable in the head, and means whereby it is normally depressed; an adjustable stop to limit the depression, and the tool adjustable longitudinally relatively to the carrier, and means for sustaining the carrier at unvarying distance above the limit determined by the stop which arrests its depression; and a gage mounted on the head and vertically adjustable, comprising a gage-finger adapted to be interposed in the line of the tool when the latter is withdrawn from the work; a lever, which carries said gage-finger; a gravity-drop, and a frictional bearing-piece for its pivot, the finger-lever being connected to said frictional bearing-piece and adapted to withdraw the same to relax the grasp upon the gravity-drop when the gage-finger is depressed.

58. In combination with a tool-head and the tool adjustable vertically with respect thereto, a gage mounted vertically adjustable on the head; and a gravity-drop adapted to be operated by the gage-wheel; the vertically-adjusting device for the gage on the head comprising a micrometer adjusting-screw and scale.

59. In combination with the tool-head, the tool-carrier adapted to be vertically adjusted in the head; the collar $V^a$ screwed onto the carrier and the ring $V^b$ encompassing and longitudinally stopped on said collar; the lever which upholds the head pivotally connected to the ring; and corresponding parts of a micrometer-scale on the exposed peripheries of the ring and collar; whereby the vertical adjustment of the carrier in the head may be noted.

60. In combination with the tracer-carrier and the work-carrier and the connections by which the components of the tracer's movement are transmitted to the work and independently modified; the pattern-table and the pattern thereon, and the tool-holder overhanging the work and adapted to operate thereon; the tracer having a point oblong in cross-section at the plane of its lateral bearing upon the pattern, the difference between the two horizontal dimensions of said tracer-point being such as to compensate for the difference between the ratios in which two components of the tracer's movement are modified in transmission to the work.

In testimony whereof I have hereunto set my hand, in the presence of two witnesses, at Chicago, Illinois, this 6th day of April, 1897.

NICHOLAS DEDRICK.

Witnesses:
E. G. NASH,
RICHARD KIEL.